United States Patent
Sauvageau et al.

(10) Patent No.: US 10,124,843 B2
(45) Date of Patent: Nov. 13, 2018

(54) TRACK SYSTEM

(71) Applicant: SOUCY INTERNATIONAL INC., Drummondville (CA)

(72) Inventors: Yves Sauvageau, Drummondville (CA); Branislav Nanac, Drummondville (CA); Jonathan Pellerin, Drummondville (CA); Francois Laflamme, St-Germain-de-Grantham (CA); Frederik Martel, Drummondville (CA); William Gasse, Drummondville (CA); Jean Gagnon, Sainte-Clotilde-de-Horton (CA); Keven Boutin, Trois-Rivieres (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 15/710,131

(22) Filed: Sep. 20, 2017

(65) Prior Publication Data
US 2018/0009490 A1 Jan. 11, 2018

Related U.S. Application Data

(63) Continuation of application No. PCT/US2017/026691, filed on Apr. 7, 2017.
(Continued)

(51) Int. Cl.
*B62D 55/08* (2006.01)
*B62D 55/10* (2006.01)
(Continued)

(52) U.S. Cl.
CPC ............ *B62D 55/08* (2013.01); *B62D 55/04* (2013.01); *B62D 55/084* (2013.01); *B62D 55/10* (2013.01);
(Continued)

(58) Field of Classification Search
CPC ...... B62D 55/08; B62D 55/10; B62D 55/104; B62D 55/244
See application file for complete search history.

(56) References Cited

U.S. PATENT DOCUMENTS 2,442,354 A * 6/1948 Gordon, Jr. .......... B62D 55/108
280/683
3,841,424 A * 10/1974 Purcell .................. B62D 55/08
180/9.5
(Continued)

FOREIGN PATENT DOCUMENTS

WO WO 2016/049760 * 4/2016 .......... B62D 55/108
WO 2016049760 A1 7/2016

OTHER PUBLICATIONS

International Search Report from PCT/US2017/026701, dated Jun. 27, 2017, Blaine R. Copenheaver.

*Primary Examiner* — Joseph M Rocca
*Assistant Examiner* — Michael R Stabley
(74) *Attorney, Agent, or Firm* — BCF LLP

(57) ABSTRACT

Track system for a vehicle having a chassis and a drive shaft extending laterally outwardly from the chassis includes: An attachment assembly having a leading pivot and a trailing pivot. A multi-member frame assembly including: a leading frame member pivotably connected to the attachment assembly via the leading pivot for pivoting about a leading pivot axis; a trailing frame member pivotably connected to the attachment assembly via the trailing pivot for pivoting about a trailing pivot axis; a leading wheel-bearing frame member at least indirectly pivotably connected to the leading frame member; a trailing wheel-bearing frame member at least indirectly pivotably connected to the trailing frame member. A damper interconnecting the leading frame member and the trailing frame member. A leading idler wheel assembly; a
(Continued)

trailing idler wheel assembly; support wheel assemblies; a gearbox; a sprocket wheel; and an endless track.

21 Claims, 30 Drawing Sheets

Related U.S. Application Data

(60) Provisional application No. 62/353,138, filed on Jun. 22, 2016.

(51) Int. Cl.
  *B62D 55/104* (2006.01)
  *B62D 55/24* (2006.01)
  *B62D 55/04* (2006.01)
  *B62D 55/084* (2006.01)
  *B62D 55/112* (2006.01)

(52) U.S. Cl.
  CPC ........ *B62D 55/104* (2013.01); *B62D 55/1125* (2013.01); *B62D 55/244* (2013.01)

(56) References Cited

U.S. PATENT DOCUMENTS

| | | | | |
|---|---|---|---|---|
| 5,452,949 | A * | 9/1995 | Kelderman | B62D 49/0635 |
| | | | | 180/9.44 |
| 5,842,757 | A * | 12/1998 | Kelderman | B62D 55/02 |
| | | | | 305/125 |
| 6,074,024 | A * | 6/2000 | Juncker | B62D 49/0635 |
| | | | | 305/125 |
| 6,543,861 | B1 * | 4/2003 | Kahle | B62D 55/04 |
| | | | | 305/143 |
| 7,222,924 | B2 * | 5/2007 | Christianson | B62D 55/10 |
| | | | | 305/125 |
| 7,597,161 | B2 * | 10/2009 | Brazier | B62D 55/04 |
| | | | | 180/9.21 |
| 9,415,817 | B2 * | 8/2016 | Rackow | B62D 55/112 |
| 9,415,818 | B1 * | 8/2016 | Tiede | B62D 55/10 |
| 9,434,426 | B2 * | 9/2016 | Nagorcka | B62D 55/14 |
| 2012/0286565 | A1 | 11/2012 | Marchildon et al. | |
| 2015/0266524 | A1 | 9/2015 | Rackow et al. | |
| 2016/0236732 | A1 | 8/2016 | Tiede et al. | |
| 2016/0236733 | A1 * | 8/2016 | Tiede | B62D 55/104 |
| 2017/0225727 | A1 * | 8/2017 | Sauvageau | B62D 55/14 |

* cited by examiner

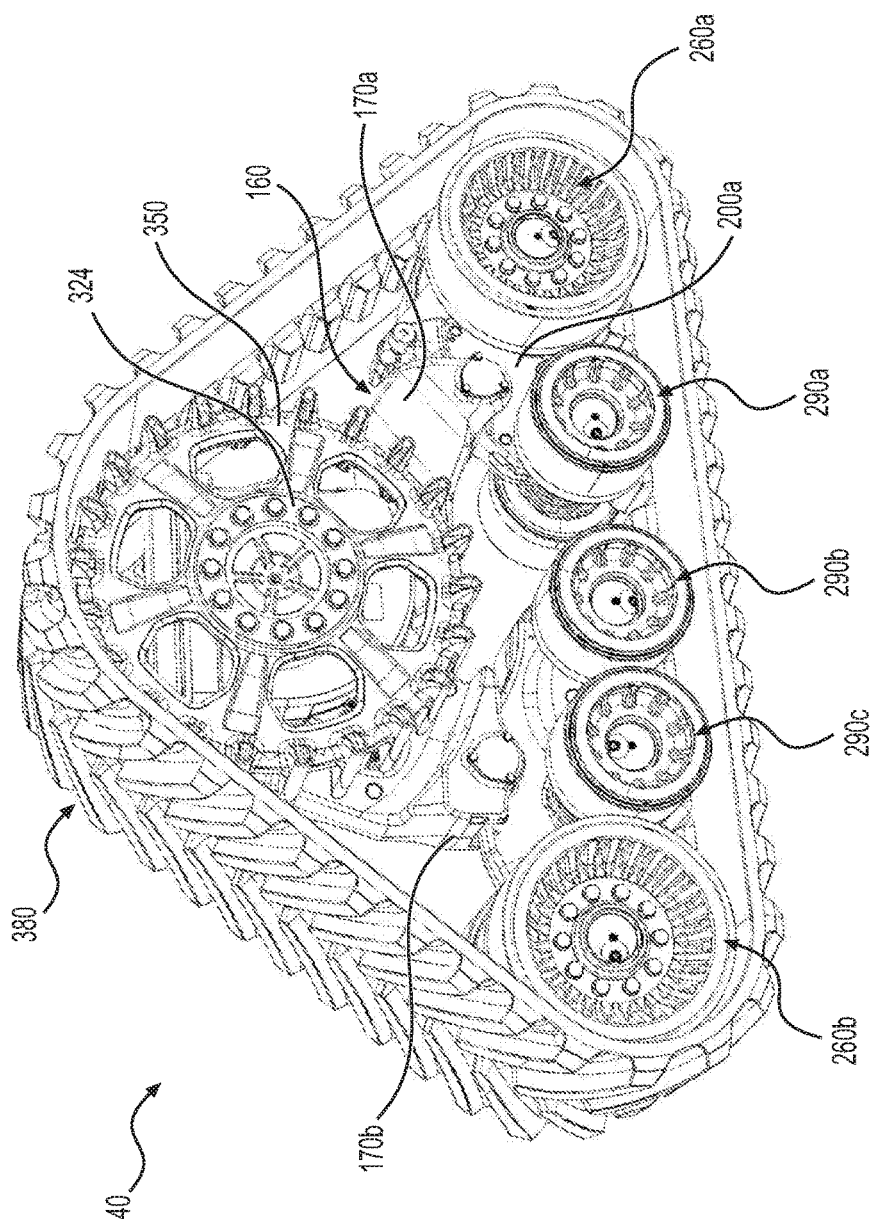

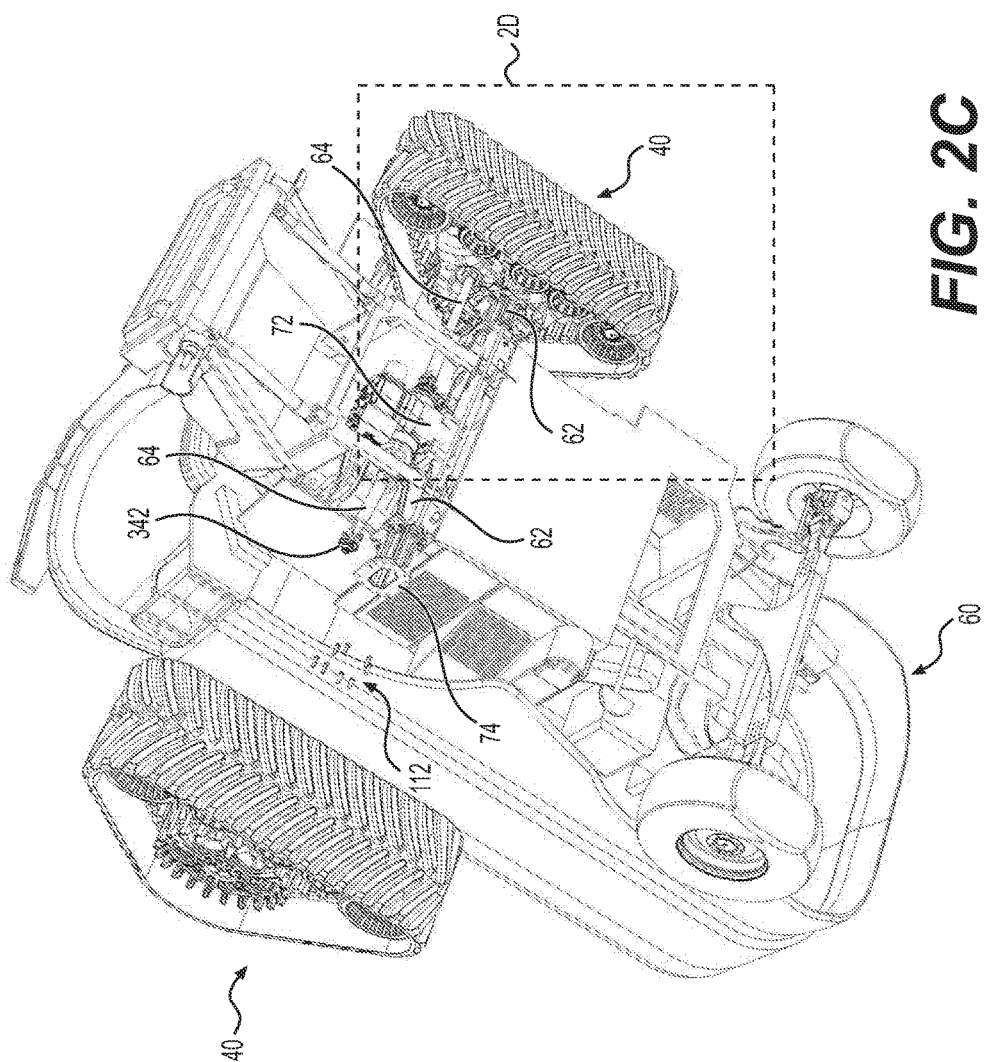

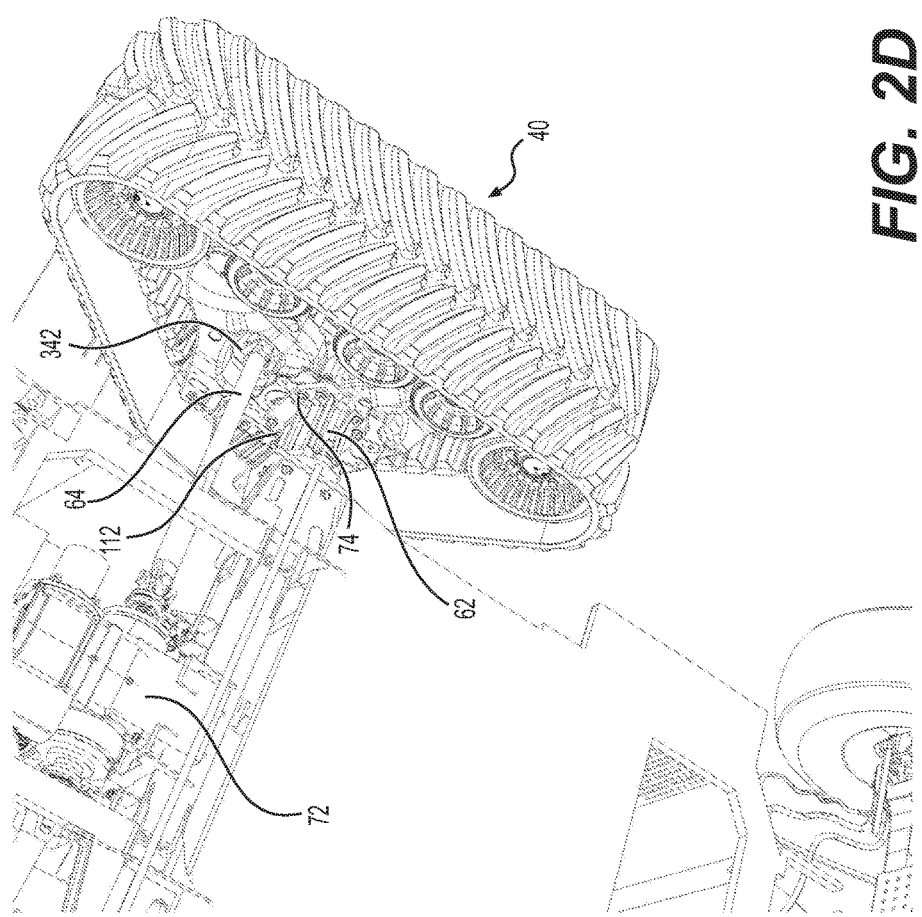

TRACK SYSTEM

CROSS-REFERENCE TO RELATED APPLICATIONS

The present application is a continuation of International Patent Application No. PCT/US2017/026691, filed Apr. 7, 2017, entitled "Track System". Through the '691 International Application, the present application claims priority to U.S. Provisional Patent Application Ser. No. 62/353,138, filed Jun. 22, 2016, entitled "Two Pivot Points Track System and Method". Both of the aforementioned patent applications are incorporated by reference herein in their entireties.

TECHNICAL FIELD

The present technology relates to track systems for vehicles.

BACKGROUND

Certain vehicles, such as, for example, agricultural vehicles (e.g., harvesters, combines, tractors, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles had have large wheels with tires on them to move the vehicle along the ground surface. Under certain conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

The use of track systems in place of wheels and tires, however, does itself present some inconveniences. One of the drawbacks of conventional track systems is that they tend to decrease the ride comfort experienced by the operator of the vehicle because the air cushion provided by a tire (between each wheel and tire) is not present in such track systems. Thus, vehicles equipped with such track systems in place of wheels and tires are typically subjected to an increased amount of vibration and vertical displacement when driven on uneven surfaces (as compared with the same vehicle having a wheel and tire), because the lack of an air cushion means there is no damping that would otherwise be provided if there were. In addition to potential increased operator discomfort, these vibrations and vertical displacements can potentially lead to premature wear of the vehicle, its component parts, and/or its attached accessories and equipment. Under certain conditions and at certain speeds, vertical displacements and vibrations transferred to the chassis can be so significant that it may be required to slow down the vehicle.

United States Patent Application Publication No. 2015/0266524 A1, published Sep. 24, 2015, and entitled "Crawler Vehicle", provides what is purported to be an improved track system in view of the vibrations which may occur with track systems described hereinabove. According to its abstract, the '524 US Publication describes a technology wherein: "A crawler vehicle has a body and at least one left and one right track roller unit. The track roller units are connected to the body via a machine axis. The track roller units comprise a first and a second guide roller as well as a first and a second supporting arm on which the guide rollers are mounted. The first and the second supporting arms of each roller unit are mounted to be pivotable independently of one another about the machine axis."

While the technology described in the '524 US Publication may indeed ameliorate some of the drawbacks of conventional track systems, continued improvement in this area is desirable.

SUMMARY

It is therefore an object of the present technology to ameliorate the situation with respect to at least one of the inconveniences present in the prior art.

It is also an object of the present invention to provide an improved track system at least in some instances as compared with some of the prior art.

According to an aspect of the present technology, there is provided a track system for use with a vehicle having a chassis and a drive shaft extending laterally outwardly from the chassis for driving the track system. In the context of the present technology, the "drive shaft" of the vehicle should be understood to be the vehicle drivetrain component that ultimately transmits rotational forces generated by the engine to the ground engaging assembly of the vehicle (e.g. the vehicle vehicle's wheel assembly when such is mounted on the vehicle, or the vehicle's track system when such is mounted on the vehicle, etc.).

The track system includes an attachment assembly that is connectable to the chassis of the vehicle. The attachment assembly has a leading pivot and a trailing pivot extending laterally outwardly therefrom. In the context of the present technology, the "leading" components of the track system are those that are disposed toward the front end of the vehicle (when the track system is properly installed on the vehicle), and the "trailing" components are those that are disposed toward the rear end of the track vehicle (when the track system is properly installed on the vehicle).

The track system further includes a multi-member frame assembly disposed laterally outwardly from the attachment assembly. The multi-member frame assembly includes a leading frame member pivotably connected to the attachment assembly via the leading pivot for pivoting about a leading pivot axis and a trailing frame member pivotably connected to the attachment assembly via the trailing pivot for pivoting about a trailing pivot axis. The leading and trailing frame members are structural components of the track system capable of supporting a material portion of the weight of the vehicle. They may be termed "primary" frame members in embodiments where they generally define the overall structure of the track system, or in embodiments where they are the frame members of the track system that first receive the load of the vehicle.

The track system further includes a leading wheel-bearing frame member at least indirectly pivotably connected to the leading frame member and a trailing wheel-bearing frame member at least indirectly pivotably connected to the trailing frame member. In the context of the present technology, the qualification of a wheel-bearing member as "at least indirectly pivotably connected" includes a wheel-bearing member that is directly pivotably connected to a frame member as well as a wheel-bearing member that is pivotably connected a frame member through an intermediate structure or structures, be they intermediate frame members or otherwise.

The track system further includes a damper interconnecting the leading frame member and the trailing frame member; a leading idler wheel assembly rotatably connected to the leading wheel-bearing frame member; a trailing idler wheel assembly rotatably connected to the trailing wheel-bearing frame member; and a plurality of support wheel assemblies disposed intermediate the leading idler wheel assembly and the trailing idler wheel assembly.

The track system further includes a gearbox having an input shaft operatively connectable to the drive shaft of the vehicle and an output shaft; a sprocket wheel operatively connected to the output shaft of the gearbox; and an endless track extending around the sprocket wheel, the leading idler wheel assembly, the trailing idler wheel assembly, and the plurality of support wheel assemblies, and drivable by the sprocket wheel.

The track system of the present technology is directed towards improving the ride comfort experienced by the operator of the vehicle under certain conditions. For example, improvement to the ride comfort might be perceived by the operator when vertical displacements of the chassis of the vehicle due to the unevenness of the ground surface are reduced and/or when vibrations generated as the vehicle travels over the ground surface are damped before being transferred from the track assembly to the vehicle chassis.

The leading and trailing frame members of the track system of the present technology define a somewhat scissor-like structure, with each frame member pivots about its respective pivot, and the damper interconnected therebetween. Each one of the leading and trailing wheel-bearing members is in turn pivotably connected to the leading or trailing frame member, respectively. The pivoting of each of these structures, along with the damper, may assist in reducing the vertical displacements and vibrations transferred to the chassis under certain conditions.

In addition, having a track system with a scissor-like structure may have other advantages in different situations. For example, as the weight of the vehicle increases, e.g. during harvesting operations, the scissor-like structure can open and the ground-contacting portion of the endless track occurs over an increased surface area (i.e. the ground contacting area can increase in size as the load borne by the track system increases—at least for some increases in load—depending on the design of a specific track system). As a result, in some circumstances, the pressure applied to the ground by the endless track (owing to the weight of the vehicle) increases at a lower rate than the weight of the vehicle. In certain embodiments, this will allow a track system of the present technology to bear additional loads as compared with conventional track systems.

The track system of the present technology, under certain conditions, can provide improved capability when the vehicle to which it is installed is travelling over soft ground. In this respect, in conventional track systems, there is a tendency of the leading edge of the endless track to pitch negatively (also known sometimes as to "dive" in the art) into soft ground when high tractive forces are requested of the track system. Such negative pitching of the leading edge of the track system can lead to track system and/or vehicle damage under some conditions. In some embodiments, the geometrical configuration of the track system of the present technology is constructed with the aim of reducing this tendency under certain conditions.

Another potential drawback found in many conventional track systems is that the track system is attached in place of the wheel on the vehicle's wheel axle. As the weight of the vehicle is borne via the axle, the weight of the vehicle is transmitted to the sprocket wheel assembly of the track assembly as it is the sprocket wheel assembly that is attached to the axle. This necessitates particular track system design parameters that in some cases are suboptimal. It may also lead to undesirable bending forces in the output shaft as the output shaft is already transmitting rotational forces to the sprocket wheel assembly of the track system. This, in turn, may lead to accelerated wear of the gearbox and of the components thereof, and to higher maintenance cost.

The track system of the present technology may reduce such issues under certain conditions as a large part of the weight of the vehicle is transferred from the chassis to track system's attachment assembly, then to the leading and trailing frame members, then to the leading and trailing wheel-bearing members and finally to the idler and support wheels and to the endless track. Thus, the sprocket wheel assembly need not (and in most embodiments, does not) bear a material amount of the vehicle weight, and does not need to be designed to do so (in most embodiments).

Having each of the leading and trailing frame members pivoting about their own pivot (as opposed to about the same pivot), may, depending on the embodiment, provide certain advantages. For example, in some embodiments, the leading and trailing pivots each bear a portion of the load borne by the track system, as opposed to a single pivot having to bear the entirety of the load borne by the system. This splitting of the load may allow for pivots that are less robust (and therefore less expensive and simpler to manufacture) than would be the case if both frame members had to be borne by a single pivot. Additionally, as in many embodiments efficient mechanical packaging is important, the dual pivot design may allow for more efficient packaging than the single pivot design, as a certain minimum contact area between the pivot and the knuckle of the frame member is required, and in many cases a dual pivot design can have more available contact area for a given width of the track system than can a single pivot design. Further, given that this is the case, the pressure between the pivot and the knuckle, in many cases, can be lower in a dual pivot design than in a single pivot design, thus again allowing for the uses of less robust components.

In some embodiments of the track system of the present technology, at least one of the leading frame member and the trailing frame member has an aperture therein. At least one of the gearbox input shaft and the drive shaft of the vehicle (e.g. the vehicle wheel axle) extends through the aperture. The aperture is shaped and dimensioned so as to allow pivotal motion of the at least one of the leading frame member and the trailing frame member notwithstanding a presence of the at least one of the gearbox input shaft and the drive shaft of the vehicle extending through the aperture. This feature assists in allowing embodiments of track systems of the present technology to be efficiently mechanically packaged, reducing the volume and/or mass of the track system, in embodiments where such is judged to be important.

In some embodiments, the leading frame member has a first aperture therein, the trailing frame member has a second aperture therein, at least one of the gearbox input shaft and the drive shaft of the vehicle extends through one of the first aperture and the second aperture, the one of the first aperture and the second aperture being shaped and dimensioned so as to allow pivotal motion of the one of the leading frame member and trailing frame member notwithstanding a presence of the at least one of the gearbox input shaft and the drive shaft of the vehicle extending therethrough. A stop extends within the other of the first aperture and the second aperture, the stop being structured and dimensioned to limit pivotal movement of the other of the leading frame member and trailing frame member. This feature may also assist in allowing embodiments of track systems of the present technology to be efficiently mechanically packaged, in embodiments where such is judged to be important.

In some embodiments, the leading pivot axis is disposed above the trailing pivot axis. In some embodiments, this feature reduces the variations in the effective perimeter of the track (which occur owing to changes in position of the idler wheel(s) and/support wheels), thus reducing the required operating range of the track tensioner.

In some embodiments, the leading wheel-bearing frame member is directly pivotably connected to the leading frame member about a first axis. The trailing wheel-bearing frame member is directly pivotably connected to the trailing frame member about a second axis. The first and second axes, the leading pivot axis and the trailing pivot axis extend perpendicularly to a plane extending parallel to a longitudinal direction of the track system, and in a rest position of the track system, the second axis is above the first axis. The rest position is defined as when the track system is attached to the vehicle, the vehicle is in its operating condition, is at rest, is unloaded, and is disposed on flat level ground.

In some embodiments, the endless track has leading, trailing and ground engaging edges. A first angle is formed between the trailing and ground engaging edges, and a second angle is formed between the leading and ground engaging edges. The first angle has a bisector, and the bisector of the first angle passes below the trailing pivot axis. In some embodiments of track systems of the present technology, this feature may assist in causing in some embodiments of track systems of the present technology a torque to be generated that reduces the tendency of the track system to have a negative pitch.

In some embodiments, the leading wheel-bearing frame member is directly pivotably connected to the leading frame member about a first axis. The trailing wheel-bearing frame member is directly pivotably connected to the trailing frame member about a second axis. Idler wheels of the leading idler wheel assembly rotate about a third axis. Idler wheels of the trailing idler wheel assembly rotate about a fourth axis. The first, second, third and fourth axes, the leading pivot axis and the trailing pivot axis extend perpendicularly to a plane extending parallel to a longitudinal direction of the track system, and the second and fourth axes intersect the bisector of the first angle.

In some embodiments, the second angle has a bisector, and the bisector of the second angle passes below the leading pivot axis. In some embodiments of track systems of the present technology, this feature may also assist in causing in some embodiments of track systems of the present technology a torque to be generated that reduces the tendency of the track system to have a negative pitch.

In some embodiments, the first and third axes intersect the bisector of the second angle.

In some embodiments, a shortest distance defined in the plane between the bisector of the first angle and the trailing pivot axis is greater than a shortest distance defined in the plane between the bisector of the second angle and the leading pivot axis.

In some embodiments, the leading wheel-bearing frame member is directly pivotably connected to the leading frame member about a first axis, the trailing wheel-bearing frame member is directly pivotably connected to the trailing frame member about a second axis, and in a rest position of the track system, the second axis is above the first axis.

In some embodiments, idler wheels of the leading idler wheel assembly rotate about a third axis and idler wheels of the trailing idler wheel assembly rotate about a fourth axis. The first, second, third and fourth axes, the leading pivot axis and the trailing pivot axis extend perpendicularly to a plane extending parallel to a longitudinal direction of the track system. A first line defined in the plane and extending between the first and third axes passes below the leading pivot axis. A second line defined in the plane and extending between the second and fourth axes passes below the trailing pivot axis.

In some embodiments, a first longitudinal distance defined in the plane between the leading pivot axis and the first axis is greater than a second longitudinal distance defined in the plane between the trailing pivot axis and the second axis.

In some embodiments, a shortest distance defined in the plane between the second line and the trailing pivot axis is greater than a shortest distance defined in the plane between the first line and the leading pivot axis.

In some embodiments, a load supported by the trailing wheel-bearing frame member is greater than a load supported by the leading wheel-bearing frame member.

In some embodiments, a trailing support wheel assembly is pivotably connected to the trailing wheel-bearing frame member about a fifth axis, and a third longitudinal distance defined in the plane between the second axis and the fourth axis is greater than a fourth longitudinal distance defined in the plane between the second axis and the fifth axis.

In some embodiments, leading support wheels are rotatably connected to the leading wheel-bearing frame member about a sixth axis, and the fourth longitudinal distance is greater than a fifth longitudinal distance defined in the plane between the first axis and the sixth axis.

In some embodiments, a trailing support wheel assembly is pivotably connected to the trailing wheel-bearing frame member, the trailing support wheel assembly including a support wheel frame member, a pair of forward support wheels rotatably connected to the support wheel frame member, and a pair of rearward support wheels rotatably connected to the support wheel frame member.

In some embodiments, the leading idler wheel assembly and the trailing idler heel assembly each include idler wheels of a same diameter.

In some embodiments, the attachment assembly includes a plate having leading pivot receiving hole shaped and dimensioned to receive the leading pivot and a trailing pivot receiving hole shaped and dimensioned to receive the trailing pivot, and the leading pivot extends through the leading pivot receiving hole and the trailing pivot extends through the trailing pivot receiving hole. This feature assists in allowing some embodiments of track systems of the present technology to be easier to manufacture, more solid, and precisely machined (as opposed to when the pivots and the plate are a single unitary article; e.g. a single cast article).

In some embodiments, the plate has a shoulder recess defined around each of the leading pivot receiving hole and the trailing pivot receiving hole. The leading pivot has a shoulder portion shaped and dimensioned to abut the shoulder recess of the leading pivot receiving hole of the plate, and the trailing pivot has a shoulder portion shaped and dimensioned to abut the shoulder recess of the trailing pivot receiving hole of the plate. This feature assists in allowing some embodiments of track systems of the present technology to be able to better distribute the load on the plate.

In some embodiments, the track system further includes fasteners extending axially through the leading pivot and the trailing pivot to fasten the gearbox. This feature may also assist in allowing embodiments of track systems of the present technology to be efficiently mechanically packaged, in embodiments where such is judged to be important.

In some embodiments, the drive shaft is connected to the input shaft of the gearbox via a constant velocity joint. This feature assists in allowing some embodiments of track systems of the present technology to interconnect the vehicle's drive shaft and the gearbox's input shaft when the two are at an angle to one another.

In some embodiments, the damper is disposed laterally inwardly from the gearbox. This feature may also assist in allowing embodiments of track systems of the present technology to be efficiently mechanically packaged, in embodiments where such is judged to be important.

In some embodiments, the track system further comprises a bracket connecting the gearbox to the attachment assembly, the bracket extending above and around the damper. The bracket may assist in protecting the damper from environmental debris entering the track system.

In some embodiments, the stop is connected to the gearbox. This feature may also assist in allowing embodiments of track systems of the present technology to be efficiently mechanically packaged, in embodiments where such is judged to be important.

In some embodiments, the track has a ground-contacting area that increases in size as a load borne by the track system increases.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 is a perspective view taken from a rear, top, right side of a track system being an embodiment of the present technology configured to be operatively connected on a right side of a vehicle;

FIG. 2C is another perspective view taken from a front, bottom, right side of the vehicle of FIG. 2A;

FIG. 2D is an enlarged view of section 2D of FIG. 2C;

DETAILED DESCRIPTION

Introduction

Figure 2A:
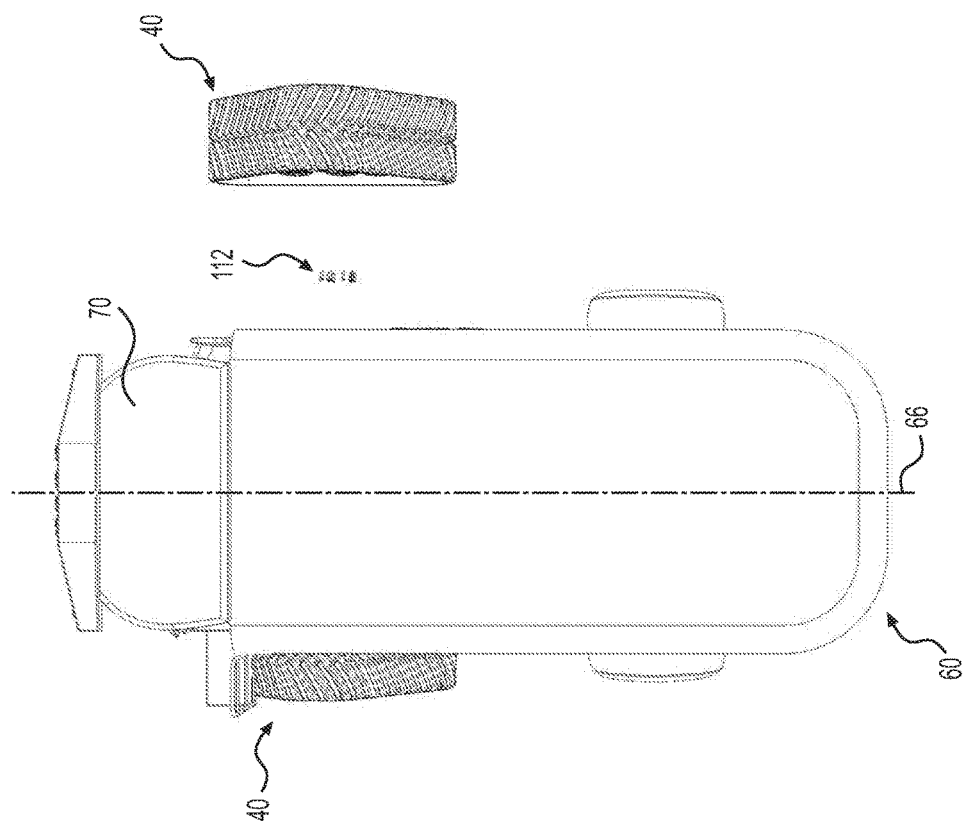
FIG. 2A is a top view of a vehicle having a track system being an embodiment of the present technology operatively connected on a left side of the vehicle and the track system of FIG. 1 on a right side of, but apart from, the vehicle.

With reference to FIGS. 1 to 5, an embodiment of the present technology, track system 40, is illustrated. It is to be expressly understood that the track system 40 is merely embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 40 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 40 may provide in certain aspects a simple embodiment of the present technology, and that where such is the case it has been presented in this manner as an aid to understanding. As persons skilled in the art would understand, various embodiments of the present technology may be of a greater complexity than what is described herein.

The track system 40 is for use with a vehicle 60 having a chassis 62 and a drive shaft 64 extending laterally outwardly from the chassis 62 for driving the track system 40. The chassis 62 supports the components of the vehicle 60, such as the cabin 70, the engine, the gearbox 72 and other drivetrain components (not shown). In this embodiment, the drive shaft 64 is the drivetrain component that transmits the driving force from the engine and gearbox 72 of the vehicle 60 to the track system 40, i.e. the drive shaft 64 is the output shaft of the gearbox 72.

Figure 3A:
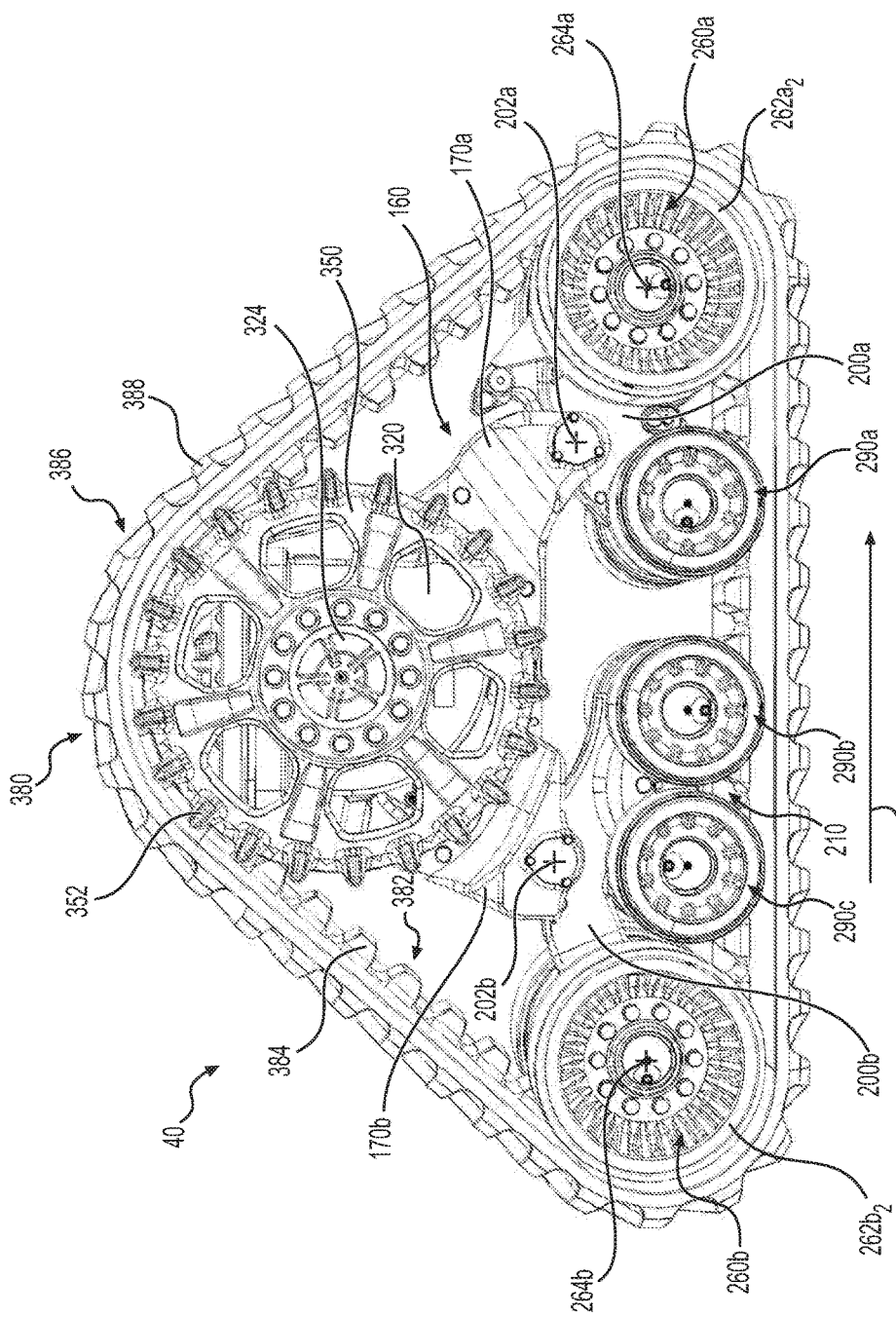
FIG. 3A is an elevation view of the left side of the track system of FIG. 1.

In the context of the following description, "outwardly" or "outward" means away from a longitudinal centerline 66 of the chassis 62 of the vehicle 60, and "inwardly" or "inward" means toward the longitudinal centerline 66. In addition, in the context of the following description, "longitudinally" means in a direction parallel to the longitudinal centerline 66 of the chassis 62 of the vehicle 60, and "transversally" means in a direction perpendicular to the longitudinal centerline 66. Note that in all the Figures, a "+" symbol is used to indicate an axis of rotation. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be. Moreover, the direction of forward travel of the track system 40 is indicated by an arrow 80 (FIG. 3A). In the present description, the "leading" components are identified with an "a" added to their reference numeral and the "trailing" components are identified with a "b" or a "c" added to their reference numeral. In addition, some components that are disposed proximate to the longitudinal centerline 66 of the vehicle 60 have a reference numeral with a "1" in index, and some components that are disposed away from the longitudinal centerline 66 of the vehicle 60 have a reference numeral with a "2" in index. In the following description and accompanying FIGS. 1 and 3A to 18C, the track system 40 is configured to be attached to a right side of the chassis 62 of the vehicle 60. A track system being another embodiment of the present technology, configured to be connected to a left side of the chassis 62 of the vehicle 60, is a mirror image of the track system 40 with the necessary adaptations, as seen in 2B to 2D; that embodiment will not be further described herein.

General Description of the Track System

Referring to FIGS. 1 to 5, the track system 40 will be generally described. The track system 40 includes an attachment assembly 100 connectable to the chassis 62 of the vehicle 60. The attachment assembly 100 includes a plate 102, leading and trailing pivots 130a, 130b (FIGS. 3B and 4) extending laterally outwardly from the attachment assembly 100 through the plate 102.

Figure 3B:
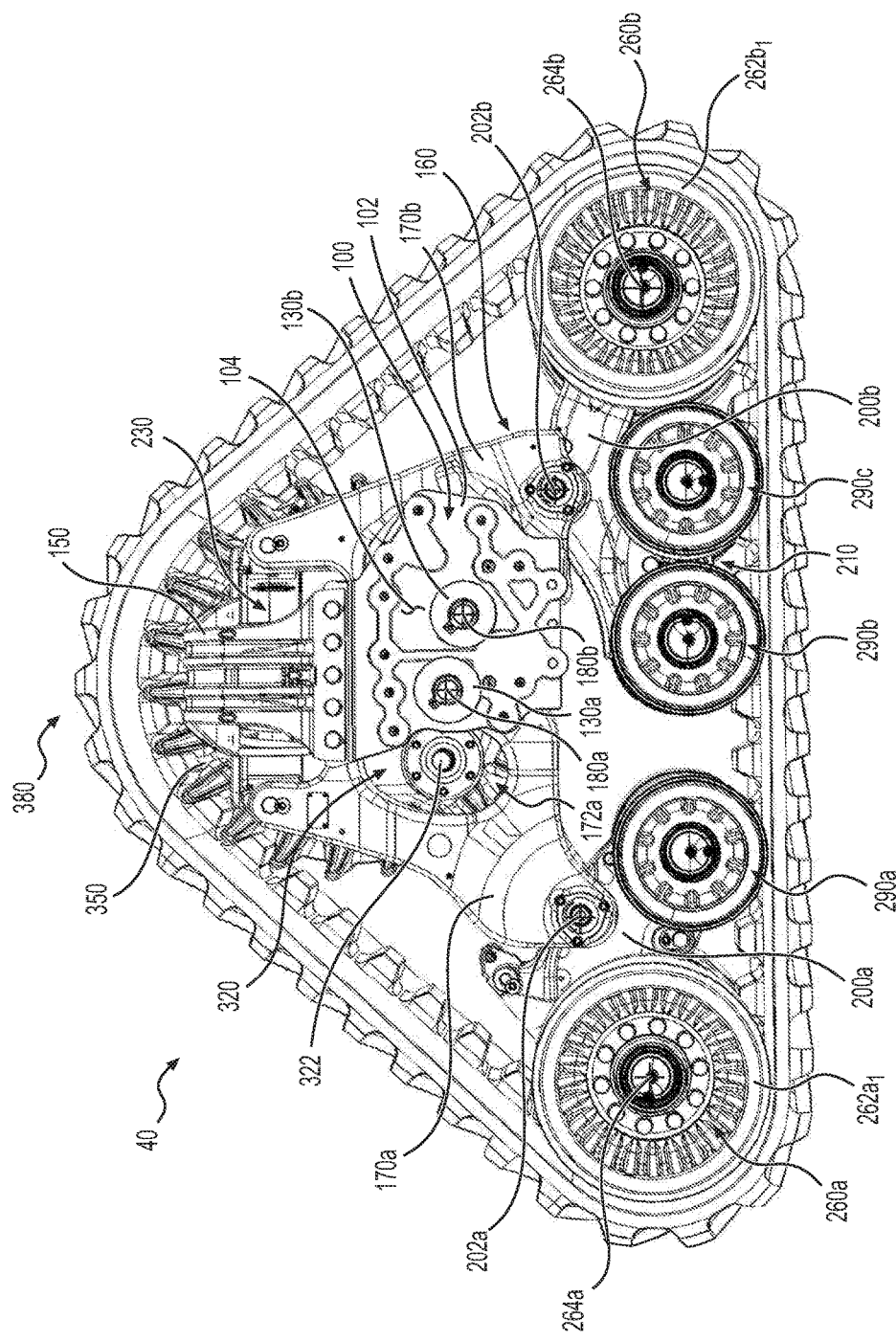
FIG. 3B is an elevation view of the right side of the track system of FIG. 1.
Figure 5:
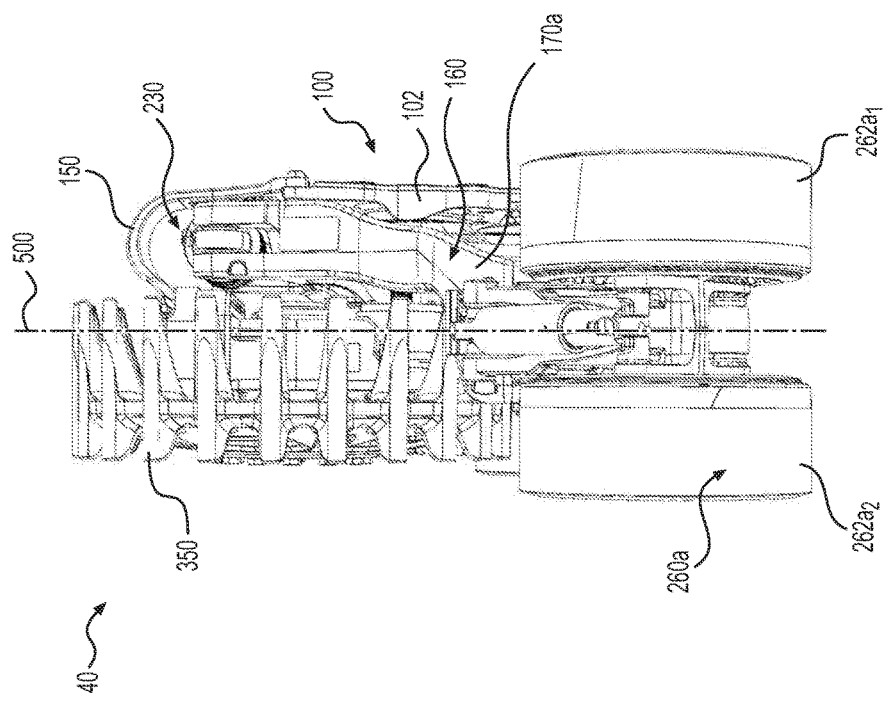
FIG. 5 is a front elevation view of the track system of FIG. 1, with the endless track removed.

The track system 40 further includes a multi-member frame assembly 160 disposed laterally outwardly from the attachment assembly 100 (FIG. 5). The multi-member frame assembly 160 includes a leading frame member 170a pivotably connected to the attachment assembly 100 via the leading pivot 130a for pivoting about a leading pivot axis 180a (FIG. 3B). The multi-member frame assembly 160 also includes a trailing frame member 170b pivotably connected to the attachment assembly 100 via the trailing pivot 130b for pivoting about a trailing pivot axis 180b (FIG. 3B). The multi-member frame assembly 160 also includes a leading wheel-bearing frame member 200a pivotably connected to the leading frame member 170a, and a trailing wheel-bearing frame member 200b pivotably connected to the trailing frame member 170b. A trailing support wheel assembly 210 is pivotably connected to the trailing wheel-bearing frame member 200b. The track system 40 further includes a damper 230 (in this embodiment a shock absorber) interconnecting the leading frame member 170a and the trailing frame member 170b. A leading idler wheel assembly 260a is rotatably connected to the leading wheel-bearing frame member 200a and a trailing idler wheel assembly 260b is rotatably connected to the trailing wheel-bearing frame member 200b. A plurality of support wheel assemblies 290a, 290b, 290c are disposed intermediate the leading idler wheel assembly 260a and the trailing idler wheel assembly 260b. The support wheel assembly 290a is rotatably connected to the leading wheel-bearing frame member 200a. The support wheel assemblies 290b, 290c are rotatably connected to the trailing support wheel assembly 210.

Still referring to FIGS. 1 to 5, the track system 40 further includes a gearbox 320 having an input shaft 322 operatively connectable to the drive shaft 64 of the vehicle 60. In FIGS. 2B to 2D, the connection of the input shaft 322 to the drive shaft 64 is shown. The gearbox 320 also includes an output shaft 324. The track system 40 further includes a sprocket wheel 350 operatively connected to the output shaft 324, and an endless track 380 extending around the sprocket wheel 350, the leading idler wheel assembly 260a, the trailing idler wheel assembly 260b, and the plurality of support wheel assemblies 290a, 290b, 290c. The endless track 380 is drivable by the sprocket wheel 350.

Endless Track

Figure 4:
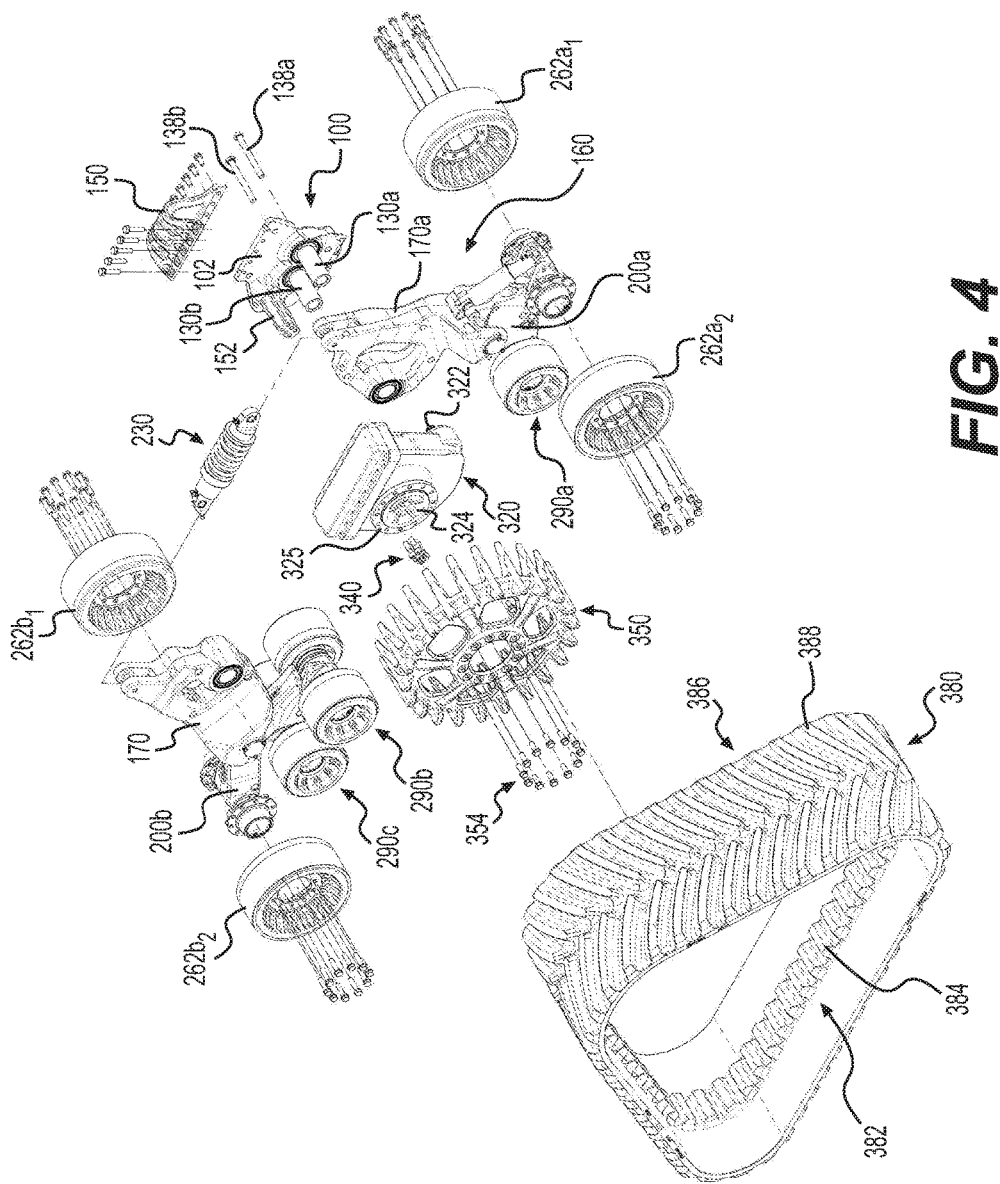
FIG. 4 is an exploded view taken from a front, top, right side of the track system of FIG. 1.

Referring to FIGS. 3A to 4, the endless track 380 is an endless polymeric track 380. The endless track 380 has an inner surface 382 engaging the leading idler wheel assembly 260a, the trailing idler wheel assembly 260b, the plurality of support wheel assemblies 290a, 290b, 290c and the sprocket wheel 350. The inner surface 382 has lugs 384 disposed on a central portion of the inner surface 382. The endless track 380 also has an outer surface 386 with a tread 388 configured for ground engagement. The tread 388 can be varied according to the type of vehicle on which the track system 40 is to be used with and/or the type of ground surface on which the vehicle will be driven. It is contemplated that within the scope of the present technology, the endless track 380 may be constructed of a wide variety of materials and structures including metallic components known in track systems. The specific properties and materials of the endless track 380 are not central to the present technology and will not be described in detail.

Figure 16:
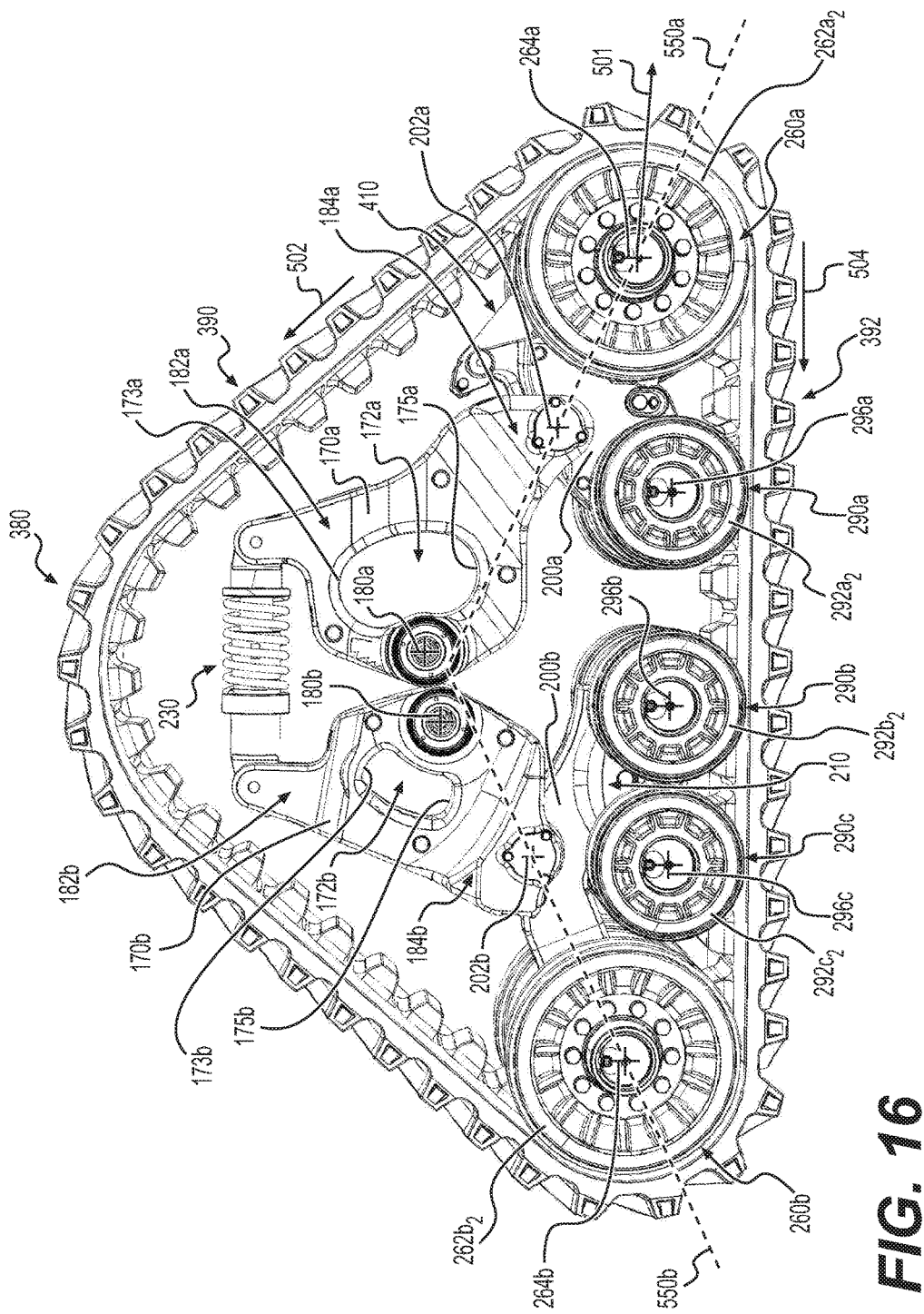
FIG. 16 is a right side elevation view of the track system of FIG. 1, with the sprocket wheel, the gearbox and the attachment assembly removed.
Figure 18A:
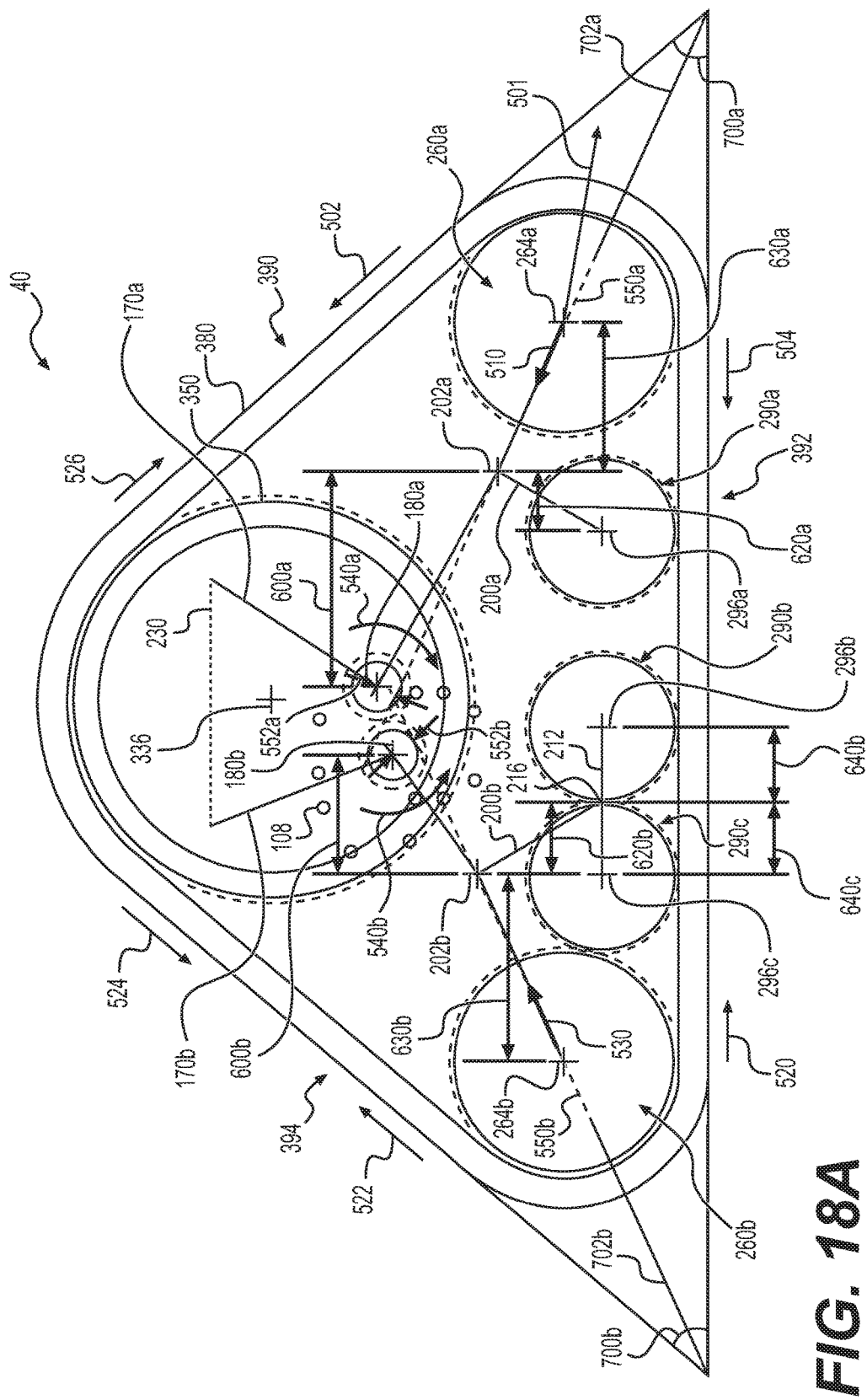
FIG. 18A is a schematic, right side elevation diagram of the track system of FIG. 1 in a rest position and stationary.

Referring to FIGS. 16 and 18A, the endless track 380 has a leading edge 390, a ground engaging edge 392 and a trailing edge 394. The "edges" of the endless track 380 are the segments of the endless track 380.

Attachment Assembly

Referring to FIGS. 4 to 10, the attachment assembly 100 will be described. The plate 102 has an inward face 104 and outward face 106 (FIGS. 9A and 9B). A bolt pattern 108 is defined on the inward face 104 of the plate 102. The holes 110 of the bolt pattern 108 are threaded bore holes, but could be through holes in other embodiments. The bolt pattern 108 that is illustrated is exemplary only and can be varied according to the type of vehicle 60 with which the track system 40 is to be used. A compatible bolt pattern 74 is defined on the chassis 62 of the vehicle 60 (FIGS. 2C and 2D). The attachment assembly 100 is connected to the chassis 62 of the vehicle 60 through fasteners 112 extending from the chassis 62 and engaging the thread of the holes 110. As a result, when the track system 40 is attached to the chassis 62, the weight of the vehicle 60 is supported by the clamping load provided by the fasteners 112 extending between the chassis 62 and the attachment assembly 100 of the track system 40. Under certain conditions, the configuration of the attachment assembly 100 and of the rest of the track system 40 is such that the chassis 62 of the vehicle 60 has the same ground clearance as when the vehicle 60 is equipped with wheels and tires in place of the track system 40. Accordingly, under certain conditions, the overall height of the vehicle 60 from ground surface is the same when the track system 40 is used in place of wheels and tires.

Plate of the Attachment Assembly

Figure 9A:
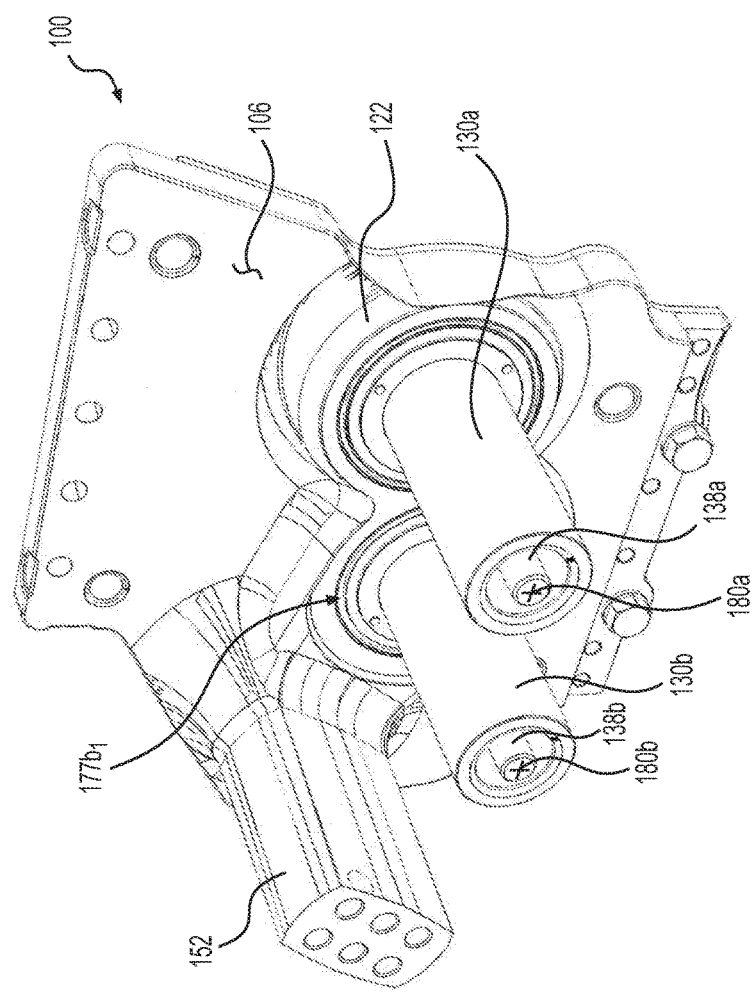
FIG. 9A is a perspective view taken from a front, top, right side of an attachment assembly of the track system of FIG. 1.
Figure 9B:
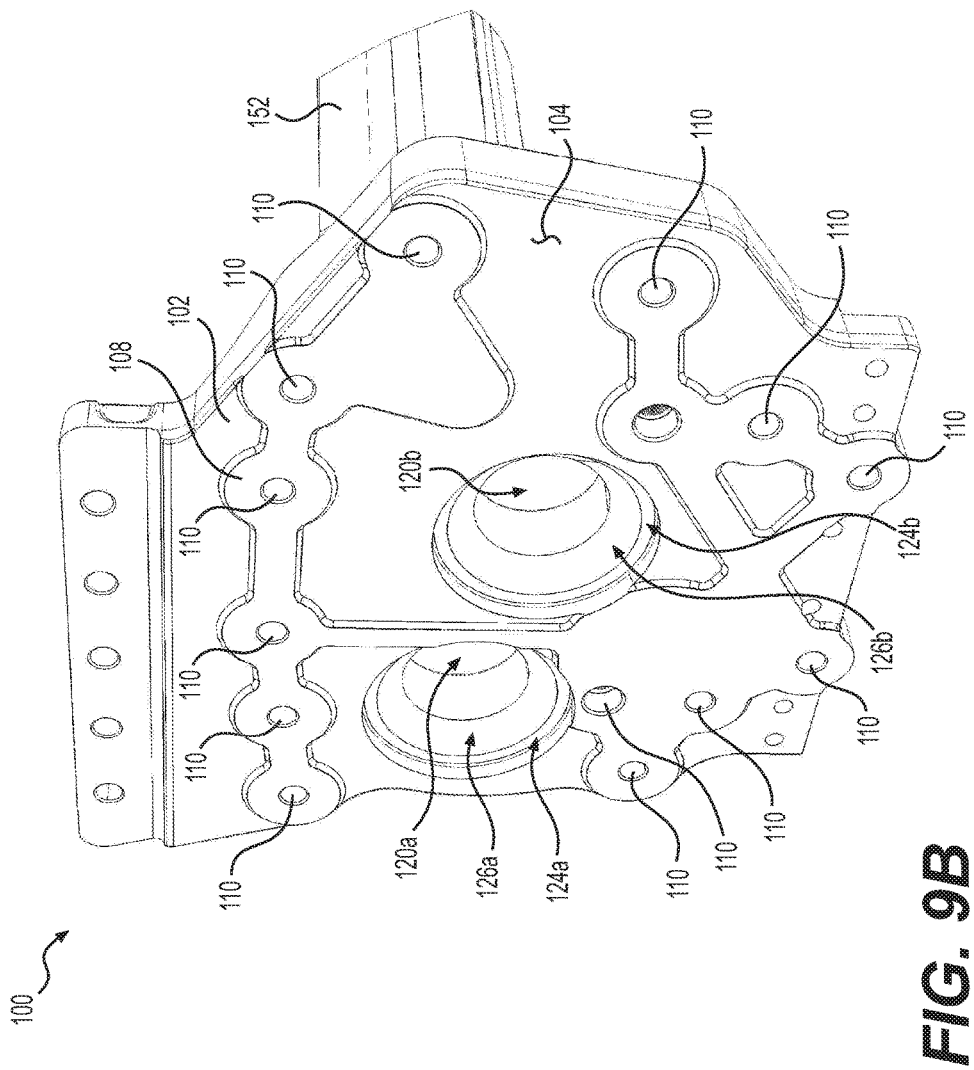
FIG. 9B is a perspective view taken from a rear, top, left side of a plate of the attachment assembly of FIG. 9A.

Referring to FIGS. 9A and 9B, the plate 102 has leading and trailing pivot receiving holes 120a, 120b therein. The leading and trailing pivot receiving holes 120a, 120b are shaped and dimensioned to receive the leading and trailing pivots 130a, 130b. The pivot receiving holes 120a, 120b extend between the inward and outward faces 104, 106 of the plate 102. The plate 102 has a reinforced portion 122 in a region adjacent to the pivot receiving holes 120a, 120b to reduce bending of the pivots 130a, 130b. In the present embodiment, the reinforced portion 122 has a thickness that is greater than that of the remainder of the plate 102. In other embodiments, the reinforced portion 122 could be otherwise configured or omitted.

The leading and trailing pivots 130a, 130b extend through the corresponding leading and trailing pivot receiving holes 120a, 120b. The pivots 130a, 130b extend horizontally and perpendicular to the attachment plate 102. The plate 102 has shoulder recesses 124a, 124b defined on the inward face 104 around each one of the leading and trailing pivot receiving holes 120a, 120b. The plate 102 also has countersinks 126a, 126b defined on the inward face 104 around each one of the leading and trailing pivot receiving holes 120a, 120b. The leading and trailing pivots 130a, 130b each have a shoulder portion 132 (FIGS. 12A and 12B) at their respective inward end 134, opposite to their outward end 136. Each shoulder portion 132 is shaped and dimensioned to abut in the corresponding shoulder recess 124a, 124b when the leading and trailing pivots 130a, 130b are inserted in the leading and trailing pivot receiving holes 120a, 120b (FIG. 12B). A fillet 133 is provided between the shoulder portion 132 and the inward end 134 of each pivot 130a, 130b. The radius of the fillet 133 can be selected to reduce stress concentrations in regions adjacent to the inward end 134.

Loads on the chassis 62 of the vehicle (including the vehicle's weight) are transferred to the plate 102 when the plate 102 is connected to the chassis 62 with the fasteners 112. They are then transferred to the leading and trailing pivots 130a, 130b and then to the leading and trailing frame members 170a, 170b, and so on. Other configurations of the plate 102 and pivots members 130a, 130b are contemplated, in other embodiments. In some embodiments, the pivots 130a, 130b could further include a countersunk portion at their inward end 134. The countersunk portion could be shaped and dimensioned to abut a corresponding one of the countersinks 126a, 126b. In some embodiments, the pivots 130a, 130b could be integrally formed with the plate 102.

Figure 6:
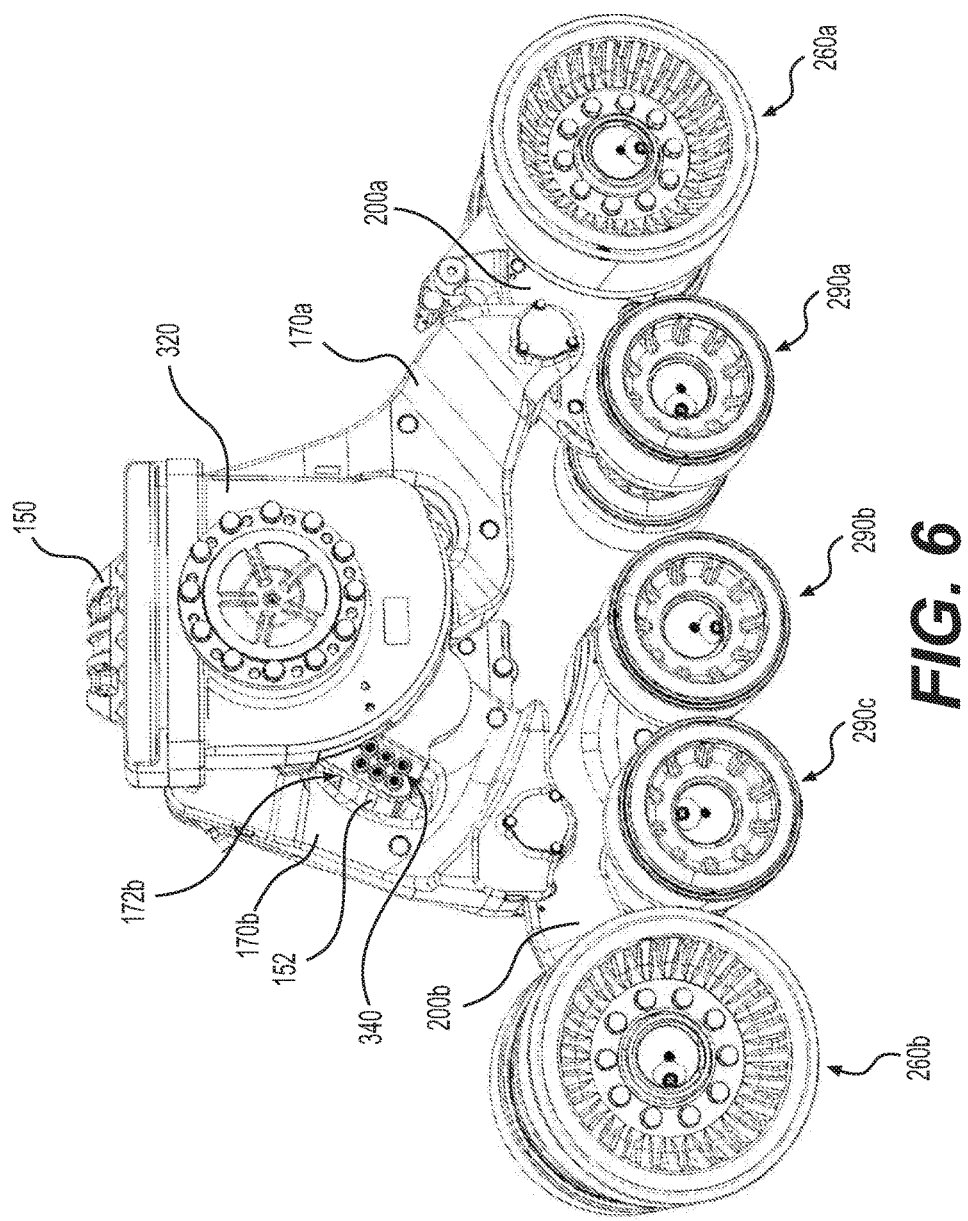
FIG. 6 is a perspective view taken from a front, top, right side of the track system of FIG. 1, with the endless track and the sprocket wheel removed.
Figure 7:
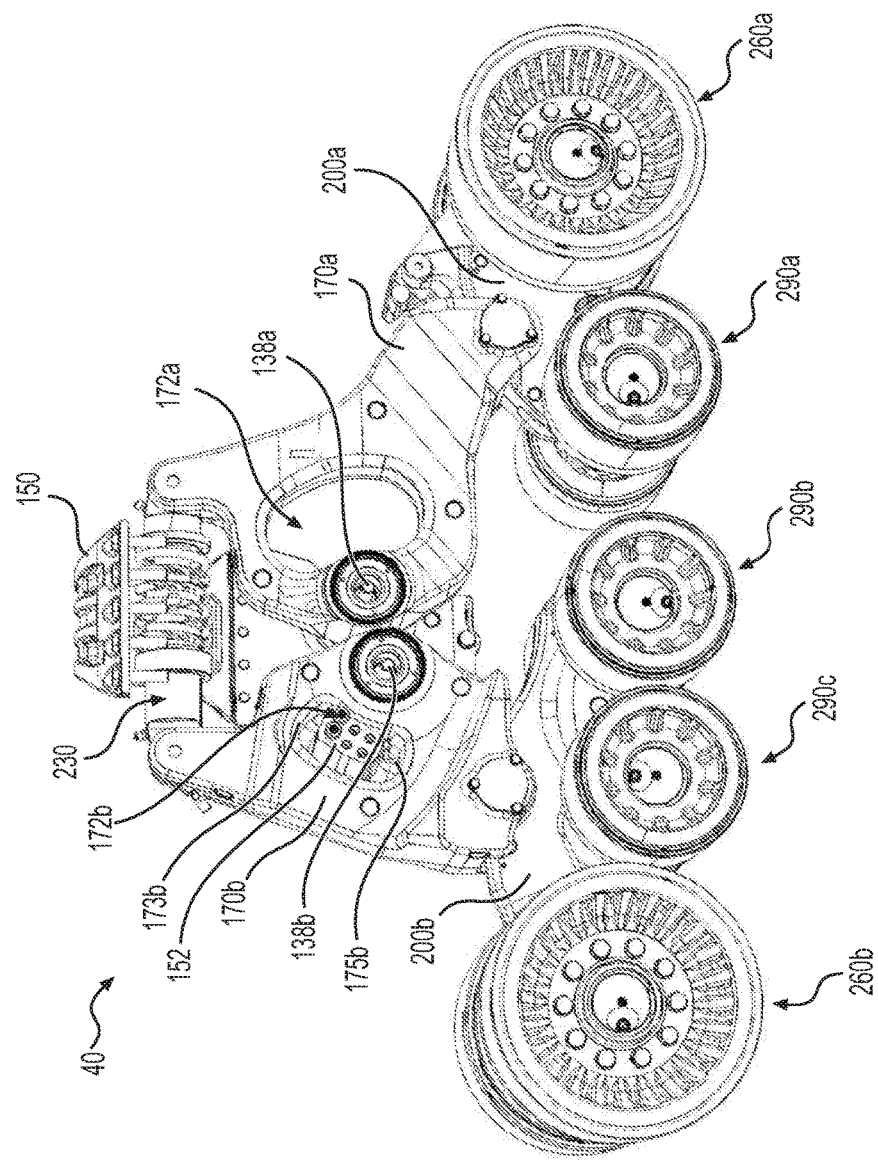
FIG. 7 is a perspective view taken from a front, top, right side of the track system of FIG. 6, with a gearbox removed.
Figure 10:
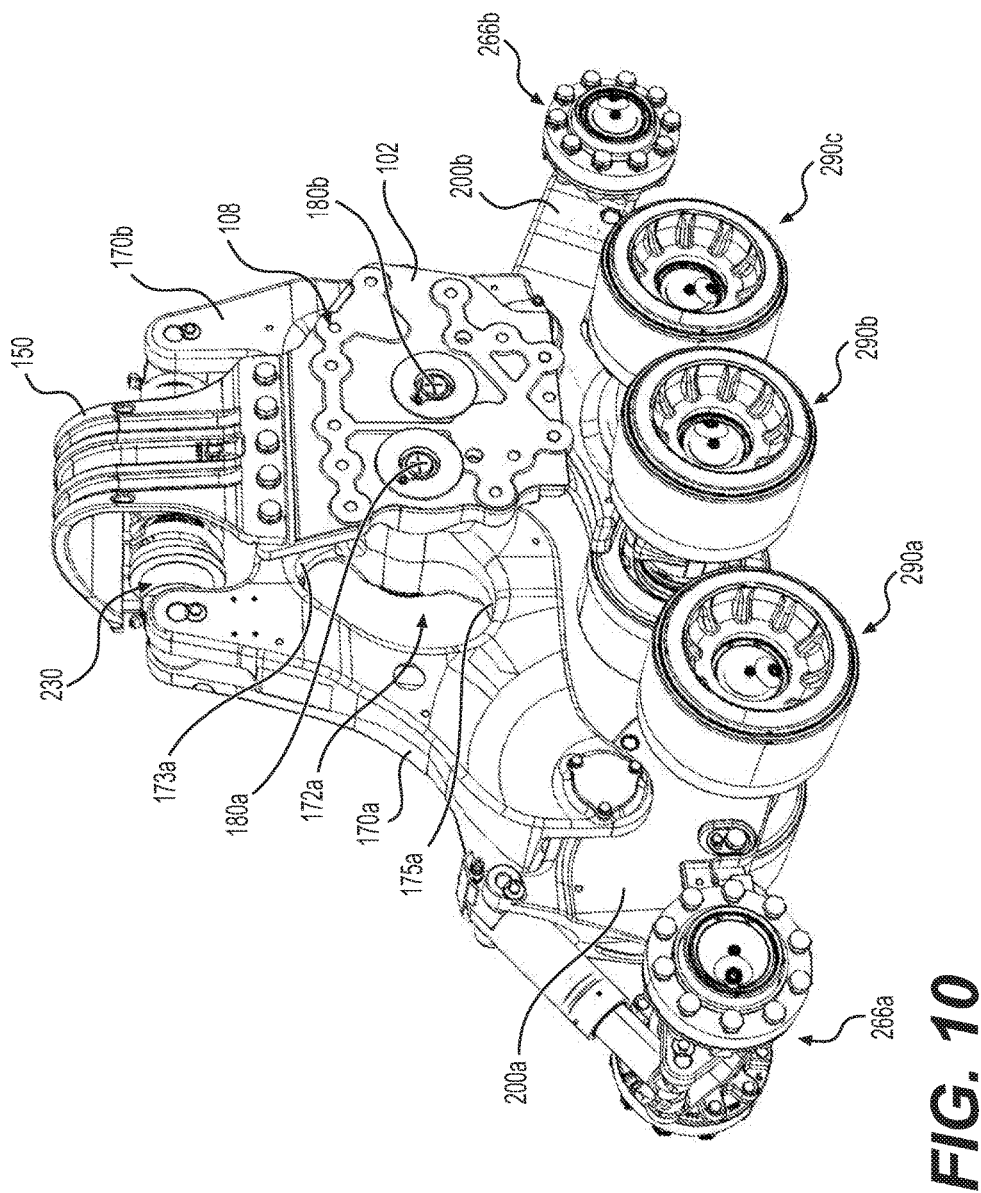
FIG. 10 is a perspective view taken from a front, top, left side of the track system of FIG. 8, with the leading and trailing idler wheels removed.
Figure 11:
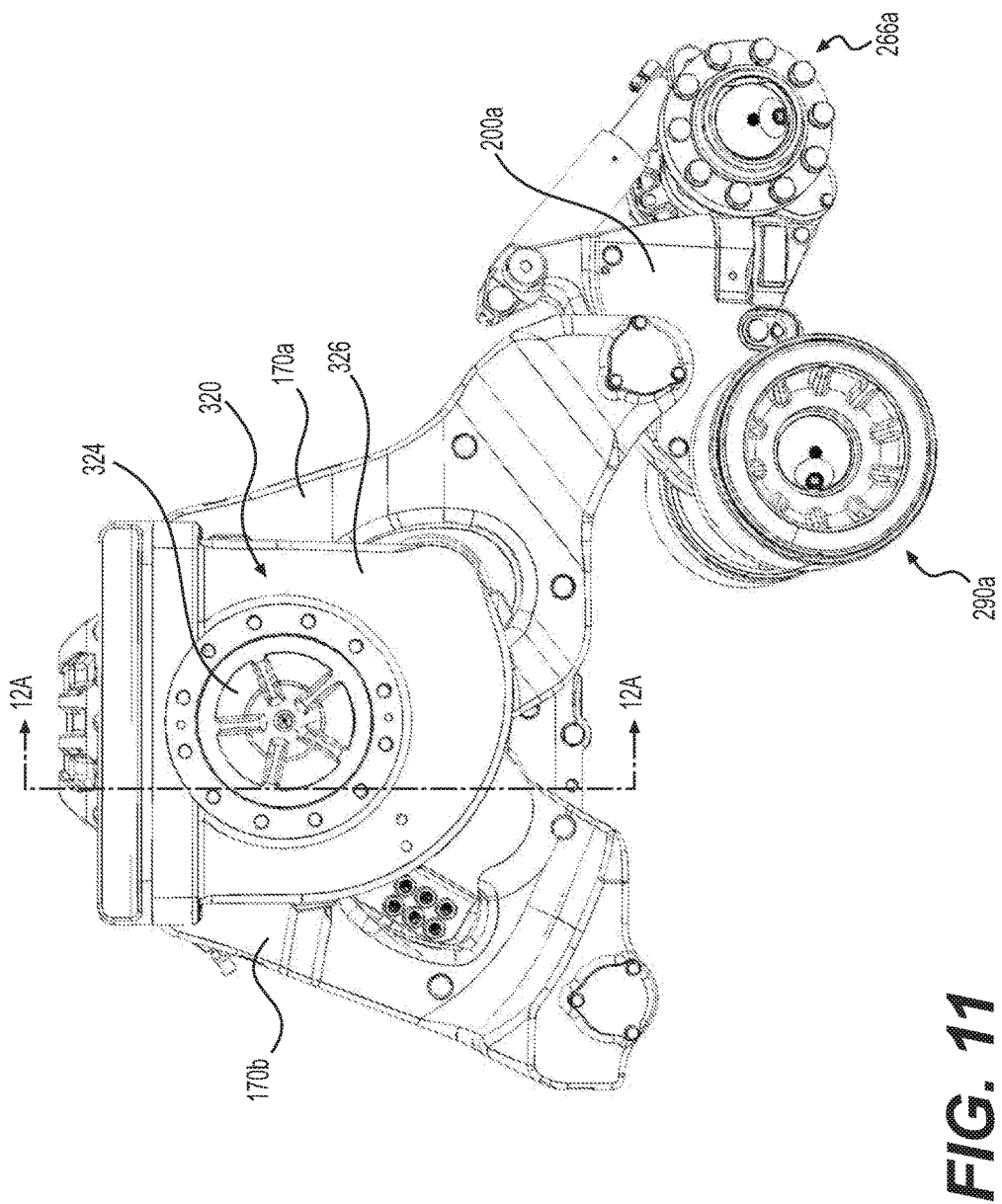
FIG. 11 is a left right elevation view of the track system of FIG. 10, with a trailing wheel-bearing frame member removed.

Referring to FIGS. 4, 7 and 12B, fasteners 138a, 138b extend axially through the leading and trailing pivots 130a, 130b to be fastened to a housing 326 of the gearbox 320. The fasteners 138a, 138b engaged with threaded connection holes 328a, 328b defined in the housing 326 of the gearbox 320 (FIGS. 12B and 15A—the figures are schematic and as such do not show the threads of the fasteners 138a, 138b nor those of the threaded connection holes 328a, 328b). As a result, the housing 326 is fastened to the attachment assembly 100 via the fasteners 138a, 138b. The fasteners 138a, 138b also hold in place the leading and trailing pivots 130a, 130b with respect to the plate 102 when the shoulder portions 132 of the pivots 130a, 130b abut the recessed shoulder portions 124a, 124b (FIG. 9B) of the plate 102. The fasteners 138a, 138b extend coaxially with the leading and trailing pivot axes 180a, 180b. The housing 326 is also connected to the attachment assembly 100 via a bracket 150 connected to the plate 102, as best seen in FIGS. 5, 6 and 10. The bracket 150 extends above and around the damper 230. The damper 230 is disposed laterally inwardly from the housing 326 of the gearbox 320. In some embodiments, the bracket 150 offers some protection to the damper 230 from debris or projections that could impact the damper 230 during operation of the vehicle 60 equipped with the track system 40. Other configurations of the bracket 150 are contemplated. For instance, in other embodiments, the bracket 150 could be integrally formed with the plate 102 or omitted.

Pivot Axes and Stop

Referring back to FIGS. 4 to 10, the leading pivot axis 180a is disposed above the trailing pivot axis 180b, as best seen in FIGS. 8 to 10. Such configuration has been found to assist in reducing vibrations in the track system 40 and to assist in reducing the variations in the perimeter of the endless track 380. Other configurations, however, are contemplated. In other embodiments, the leading and trailing pivot axes 180a, 180b could be at a same height with respect to the ground surface. In yet other embodiments, the leading and trailing pivot axes 180a, 180b could be disposed one above the other. In some embodiments, the positioning of the leading and trailing pivot axes 180a, 180b is determined by the bolt pattern 108 since the positioning of the leading and trailing pivot 130a, 130b and of the reinforced portion 122 adjacent thereto should not interfere with the bolt pattern 108.

A stop 152 is integrally formed in the plate 102 of the attachment assembly 100 (FIG. 9A). The stop 152 extends laterally outwardly from the outward face 106 of the plate 102. The stop 152 extends through an aperture 172b defined in the trailing frame member 170b. The stop 152 is structured and dimensioned to limit the pivotal movement of the trailing frame member 170b about the trailing pivot axis 180b. The aperture 172b is arcuate, but it could be otherwise. In some embodiments, the center of the arc of the aperture 172b coincides with the trailing pivot axis 180b. When the trailing frame member 170b pivots about the trailing pivot axis 180b, upper and lower walls 173b, 175b (FIGS. 7 and 16) of the aperture 172b can abut the stop 152 and thus limit the pivotal movement of the trailing frame member 170*b*. The stop 152 and/or the aperture 172*b* could be otherwise configured in other embodiments and limit the pivotal movement of the trailing frame member 170*b* to a lesser or greater extent than the one illustrated. The stop 152 is further connected to the housing 326 using fasteners 340 (FIGS. 4 and 6). In some embodiments, the stop 152 is only connected to the attachment assembly 100. In some embodiments, the stop 152 is a separate component from the plate 102 and is connected thereto using fasteners and/or bonding techniques. In some embodiments, the stop 152 has a coating made of a compliant material such as rubber or an elastomer, or has rubber parts attached thereto. In some embodiments, the stop 152 deflects along its length when contacted by the trailing frame member 170*b*. In some embodiments, the trailing frame member 170*b* does not have an aperture 172*b* defined therein and one or more stops extending from the outward face 106 of the plate 102 could engage the trailing frame member 170*b* on a top or bottom sidewall thereof. In some embodiments, the stop 152 could be omitted.

Leading and Trailing Frame Members

Referring to FIGS. 11, 12A, 12B, 16 and 17, the leading and trailing frame members 170*a*, 170*b* will be described. The leading and trailing frame members 170*a*, 170*b* are pivotably connected to the attachment assembly 100 as they are supported by the leading and trailing pivots 130*a*, 130*b*. The leading and trailing frame members 170*a*, 170*b* are disposed laterally outwardly from the attachment assembly 100 (FIG. 5). In order to facilitate the pivoting of the leading and trailing frame members 170*a*, 170*b* on the leading and trailing pivots 130*a*, 130*b*, in this embodiment, spherical bearings are disposed between each pivot member 130*a*, 130*b* and each frame member 170*a*, 170*b*. For illustrative purposes, the configuration of the pivot, frame member and spherical bearings will be described with reference to the trailing frame member 170*b*, as, in this embodiment, the leading frame member 170*a* has a similar configuration.

Figure 12A:
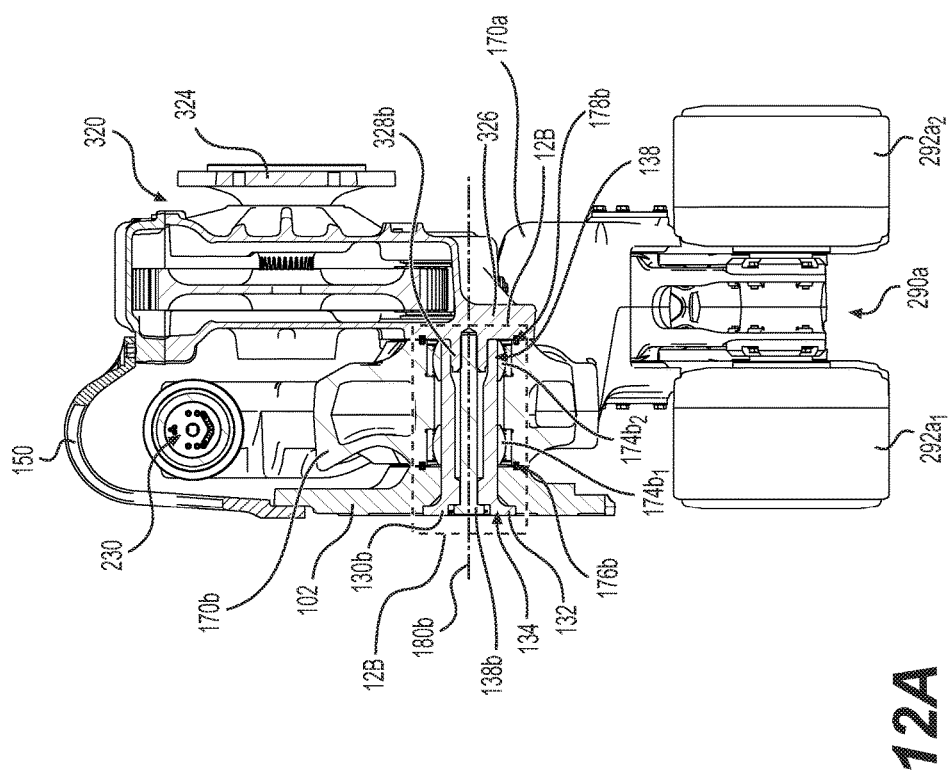
FIG. 12A is a cross-sectional view of the track system of FIG. 11 taken along cross-section line 12A-12A in FIG. 11.
Figure 12B:
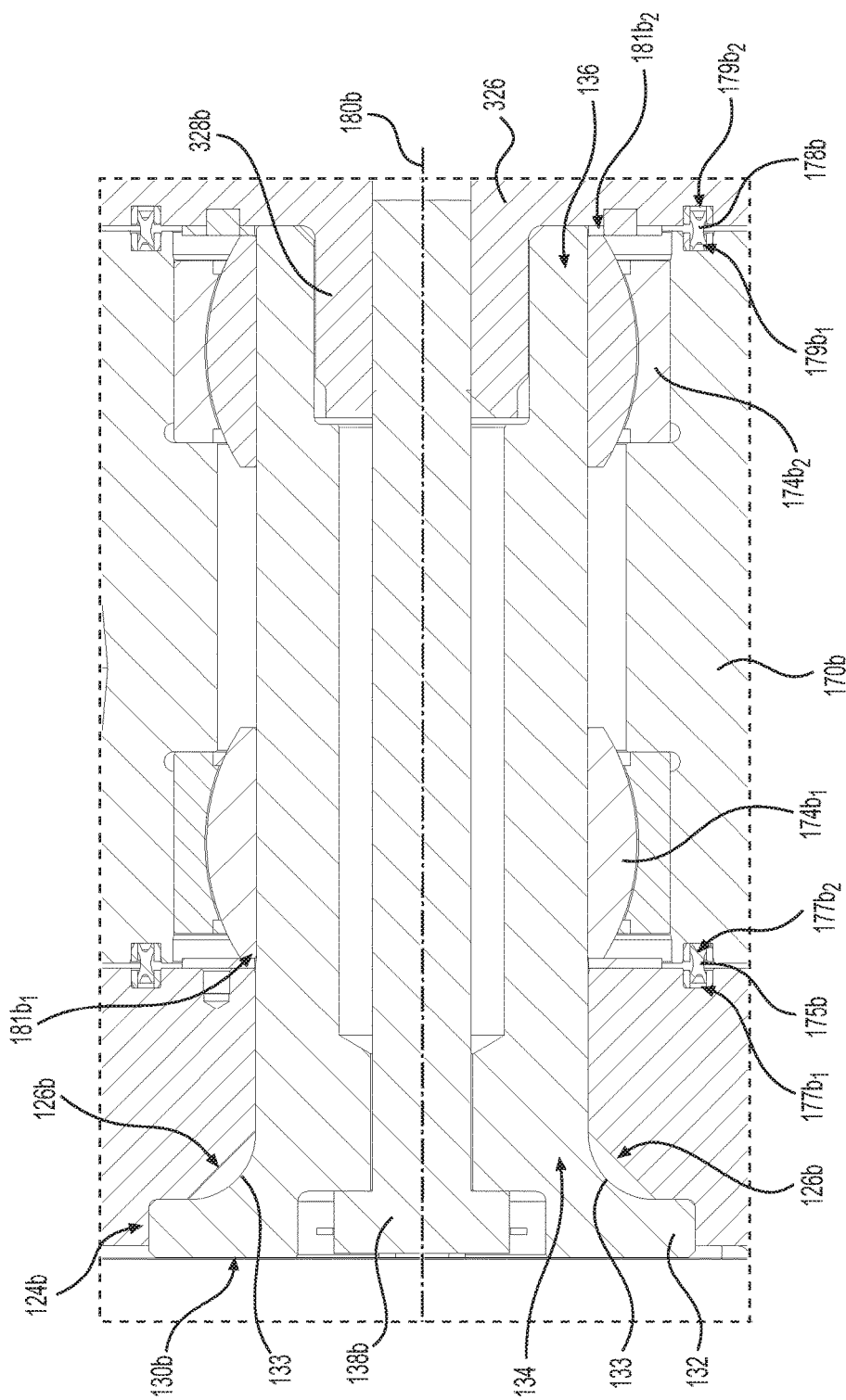
FIG. 12B is an enlarged view of section 12B of FIG. 12A.
Figure 13:
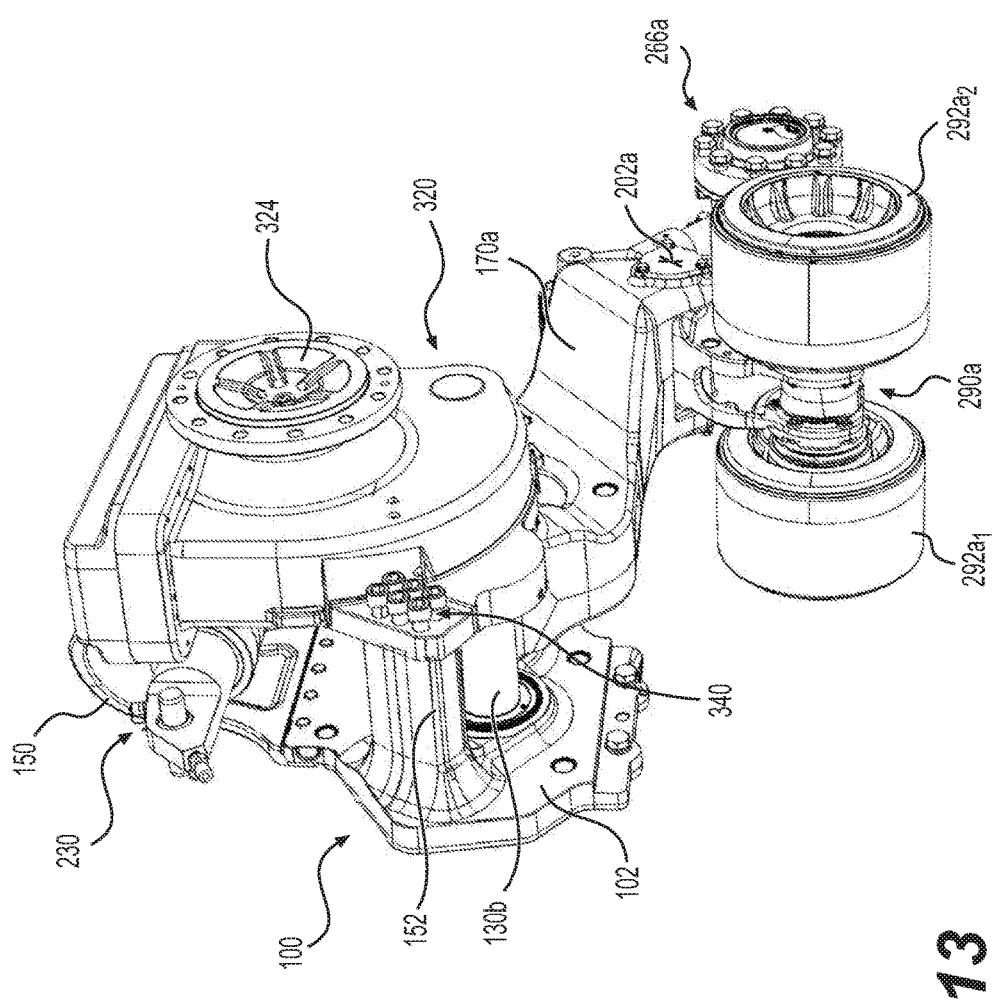
FIG. 13 is a perspective view taken from a rear, bottom, right side of the track system of FIG. 11, with a trailing frame member removed.

Referring to FIGS. 12A and 12B, spherical bearings $174b_1$, $174b_2$ are disposed between the trailing frame member 170*b* and the trailing pivot 130*b*. The spherical bearings $174b_1$, $174b_2$ are spaced apart along the length of the pivot 130*b*, one proximate the inward end 134 and the other proximate the outward end 136 thereof. In some embodiments, the spherical bearings $174b_1$, $174b_2$ could be replaced by bushings, plain bearings or tapper rollers disposed between the pivot 130*b* and the trailing frame member 170*b*.

Referring to FIGS. 9A and 12B, a seal 176*b* is disposed between the trailing frame member 170*b* and the attachment assembly 100, proximate the inward end 134 of the pivot 130*b*. Grooves $177b_1$, $177b_2$ are defined in the plate 102 and in the inward face of the trailing frame member 170*b* to receive a portion of the seal 176*b*. A similar configuration is found on the leading frame member 170*a* proximate the leading pivot 130*a*. A seal 178*b* is disposed between the leading and trailing frame members 170*a*, 170*b* and the housing 326 proximate to the outward end 136 of the pivots 130*a*, 130*b*. Grooves $179b_1$, $179b_2$ (FIGS. 12B and 15A) are defined in the outward face of the trailing frame member 170*b* and the inward face of the housing 326 to receive a portion of the seal 178*b*. A similar configuration is found on the leading frame member 170*a* proximate the leading pivot 130*a*. The leading and trailing frame members 170*a*, 170*b* do not contact the plate 102 nor the housing 326 as there is a gap $181b_1$ between the bearing $174b_1$ and the plate 102. Another gap $181b_2$ exists between the bearing $174b_2$ and the housing 326. In some embodiments, the gap $181b_1$ is smaller than the gap $181b_2$. In some embodiments, the leading and trailing frame members 170*a*, 170*b* are movable axially on the pivots 130*a*, 130*b* respectively.

Figure 2B:
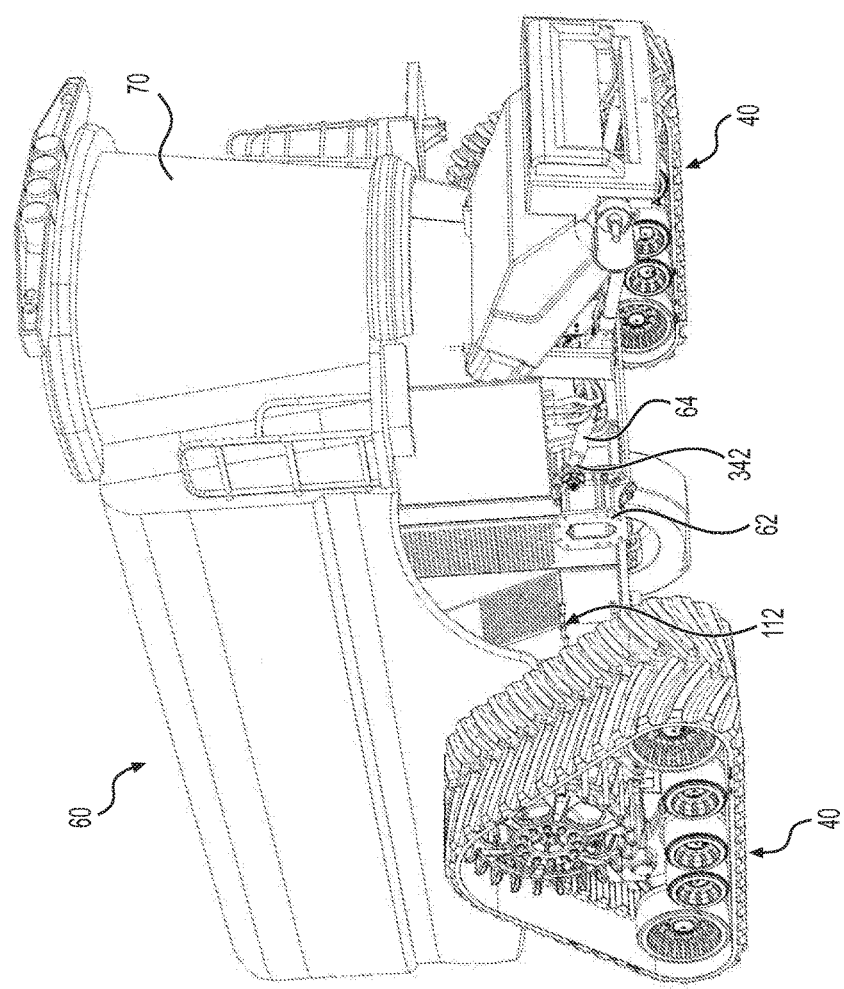
FIG. 2B is a perspective view taken from a front, bottom, right side of the vehicle of FIG. 2A.

Referring to FIGS. 10 to 17, the leading frame member 170*a* has an aperture 172*a* defined therein. The input shaft 322 of the gearbox 320 extends laterally inwardly through the aperture 172*a* (FIG. 2D) for operative connection to the drive shaft 64 of the vehicle 60. In some embodiments, the input shaft 322 extends completely through the aperture 172*a* for operative connection to the drive shaft 64. The input shaft 322 and the drive shaft 64 are operatively connected through a constant velocity joint 342 (FIGS. 2B to 2D). The input shaft 322 and the drive shaft 64 could be operatively connected otherwise. For example, in some embodiments, the input shaft 322 and the drive shaft 64 could be coaxial and operatively connected together using a splined sleeve or a coupling. The aperture 172*a* is shaped and dimensioned so as to allow pivotal motion of the leading frame member 170*a* notwithstanding the presence of the input shaft 322 and/or the drive shaft 64 extending through the aperture 172*a*. In other words, the aperture 172*a* is shaped and dimensioned such that the input shaft 322 and/or the drive shaft 64 extending through the aperture 172*a* are prevented from contacting the upper and lower walls 173*a*, 175*a* of the aperture 172*a* (FIGS. 10 and 16) when the leading frame member 170*a* pivots. The aperture 172*a* is arcuate in this embodiment, but the aperture 172*a* could be otherwise in other embodiments. In some embodiments, the center of the arc of the aperture 172*a* coincides with the leading pivot axis 180*a*. In some embodiments, the aperture 172*a* extends until one of the upper and lower sidewalls of the frame member 170*a* and forms a slot in the frame member 170*a*.

In some embodiments, the gearbox 320 could be configured such that the input shaft 322 extends through the aperture 172*b* defined in the trailing frame member 170*b* and the attachment assembly 100 could be configured such that the stop 152 extends through the aperture 172*a* defined in the leading frame member 170*a*.

It is noted that in embodiments of the present technology, the drive shaft 64 of the vehicle 60 does not bear a material portion of the weight of the vehicle 60 but only transmits rotational forces to the gearbox 320 via the operative connection with the input shaft 322. The output shaft 324 of the gearbox 320 does not bear a material portion of the weight of the vehicle 60 either. The output shaft 324 is subjected to bending forces due to the tension present in the endless track 320 and to rotational forces transmitted by the input shaft 322.

Damper

Figure 17:
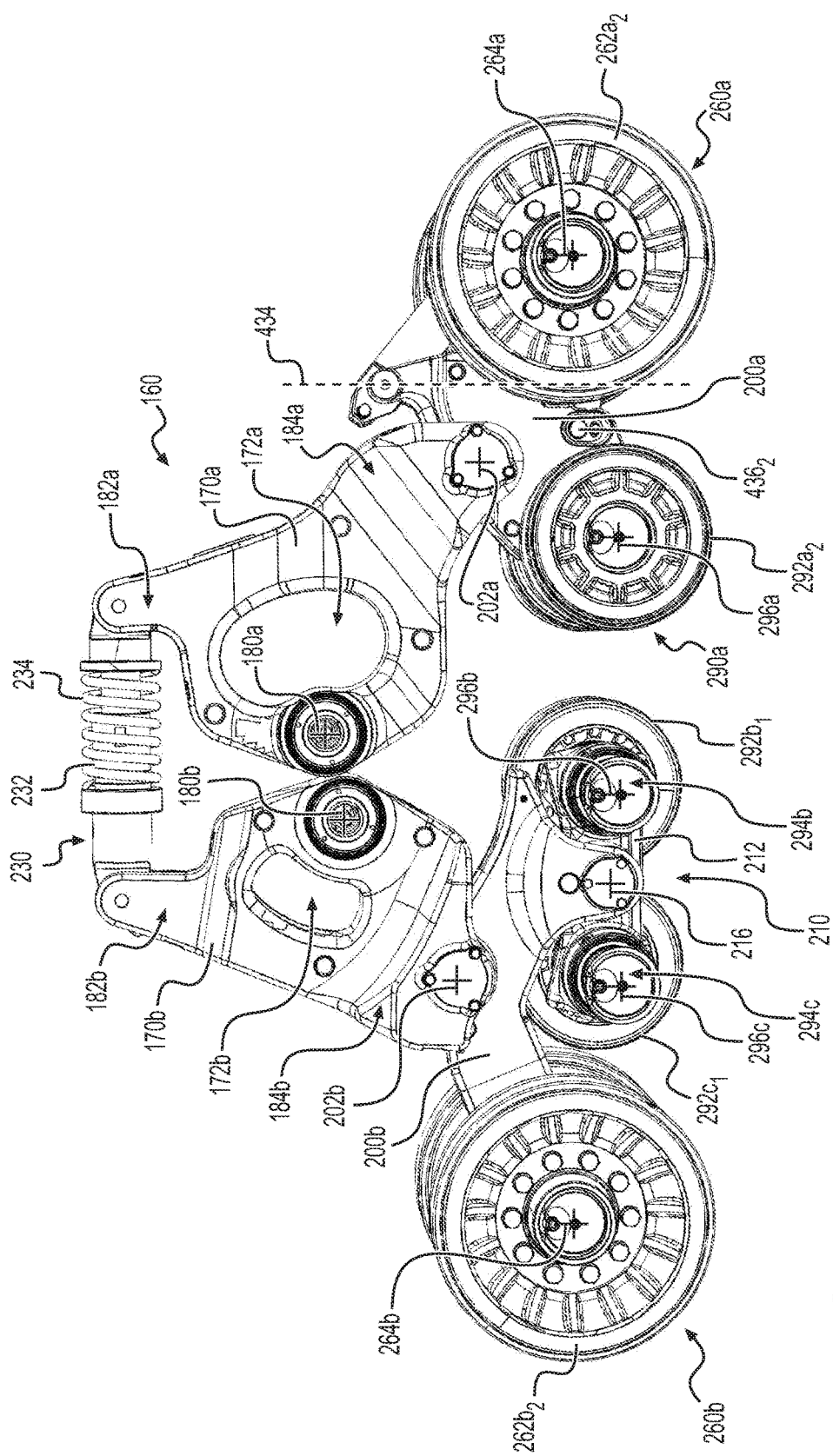
FIG. 17 is a right side elevation view of the track system of FIG. 16, with the endless track and two trailing support wheels removed.

Referring to FIGS. 16 and 17, the leading and trailing frame members 170*a*, 170*b* each have upper and lower portions 182*a*, 182*b*, 184*a*, 184*b*. The upper portions 182*a*, 184*a* extend above the corresponding pivot axes 180*a*, 180*b* and the lower portions extend below the pivot axes 180*a*, 180*b*. The damper 230 is rotatably connected to the upper portions 182*a*, 182*b* of the leading and trailing frame members 170*a*, 170*b*.

The damper 230 includes a hydro-pneumatic cylinder 232 and a coil spring 234. The damper 230 biases the upper portions 182*a*, 182*b* of the leading and trailing frame members 170*a*, 170*b* away from each other. When the track system 40 supports the weight of the vehicle 60, the coil spring 234 is deformed (i.e. compressed) and the cylinder 232 provides for a damped pivotal motion of the leading and trailing frame members 170*a*, 170*b* with respect to each other.

The positioning of the damper 230 between the upper portions 182a, 182b of the leading and trailing frame members 170a, 170b allows for a long stroke of the cylinder 232 of the damper 230. As a result, the damping action of the damper 230 is generally more refined than in conventional track systems where the stroke of a damping cylinder is shorter. A spring rate of the coil spring 234 is also decreased compared to conventional track systems where the stroke of the damper is shorter. Such configuration provides for a smoother damping action of the damper 230 and may reduce the risks of fully compressing the damper 230. Under certain conditions, vibrations that are due to the surface of the ground on which the track system 40 travels and transferred to the leading and trailing frame members 170a, 170b are dampened by the damper 230.

As described above, the stop 152 limits the pivotal motion of the trailing frame member 170b, and the pivotal motion of the leading frame member 170a is limited by the stroke of the cylinder 232.

In some embodiments, the damper 230 has variable damping characteristics as described in commonly owned International Patent Application No. PCT/CA2016/050418, filed Apr. 11, 2016, entitled "Progressive Damping System for a Track System" and published as WO 2016/161527. (This application is incorporated herein by reference in its entirety.)

Gearbox and Sprocket Wheel

Referring to FIGS. 2, 4, 11, 12 and 15A to 15C, the gearbox 320 and the sprocket wheel 350 will be described. The gearbox 320 is disposed outwardly from the leading and trailing frame members 170a, 170b. The gearbox 320 is disposed inwardly from the sprocket wheel 350. Teeth 352 of the sprocket wheel 350 pass around the gearbox 320 when the sprocket wheel 350 is rotated. The input shaft 322 is connected to an input gear 330 located inside the housing 326 of the gearbox 320. The input shaft 322 and the input gear 330 rotate about an axis 334. The input gear 330 drives an output gear 332 connected to the output shaft 324. The output gear 332 is also located inside the housing 326 of the gearbox 320. The output shaft 324 and the output gear 332 rotate about an axis 336. The axes 334, 336 are parallel and offset, but could be coaxial in other embodiments. The engagement of the input gear 330 and the output gear 332 is direct, but a chain or belt could be used in other embodiments to transmit rotational movement from the input gear 330 to the output gear 332.

Figure 15A:
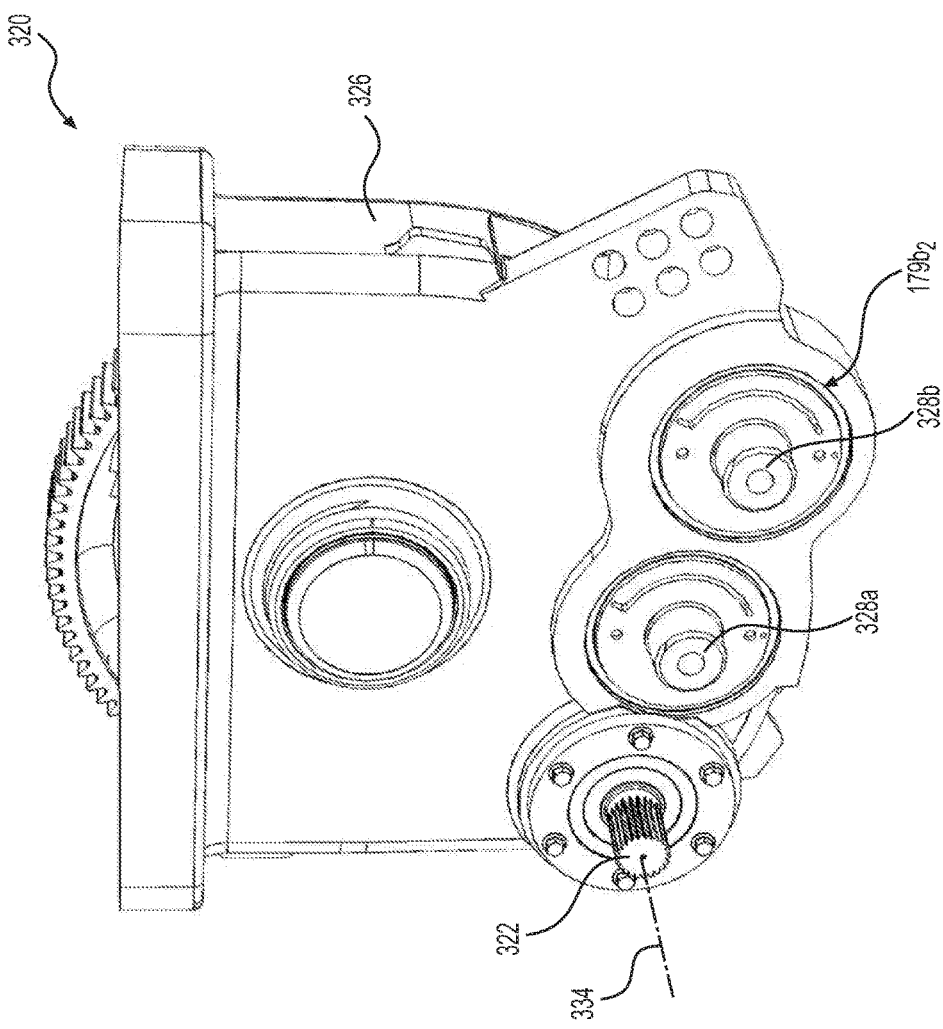
FIG. 15A is a perspective view taken from a rear, top, left side of the gearbox of the track system of FIG. 1.
Figure 15B:
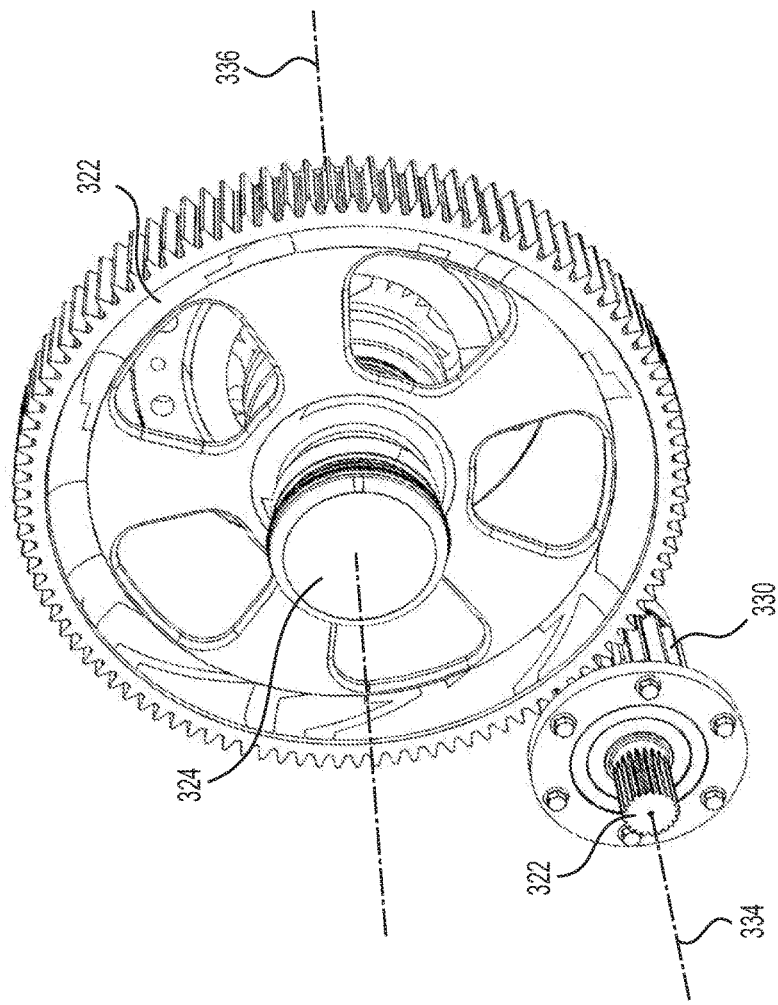
FIG. 15B is a perspective view taken from a rear, top, left side of components of the gearbox of FIG. 15A.
Figure 15C:
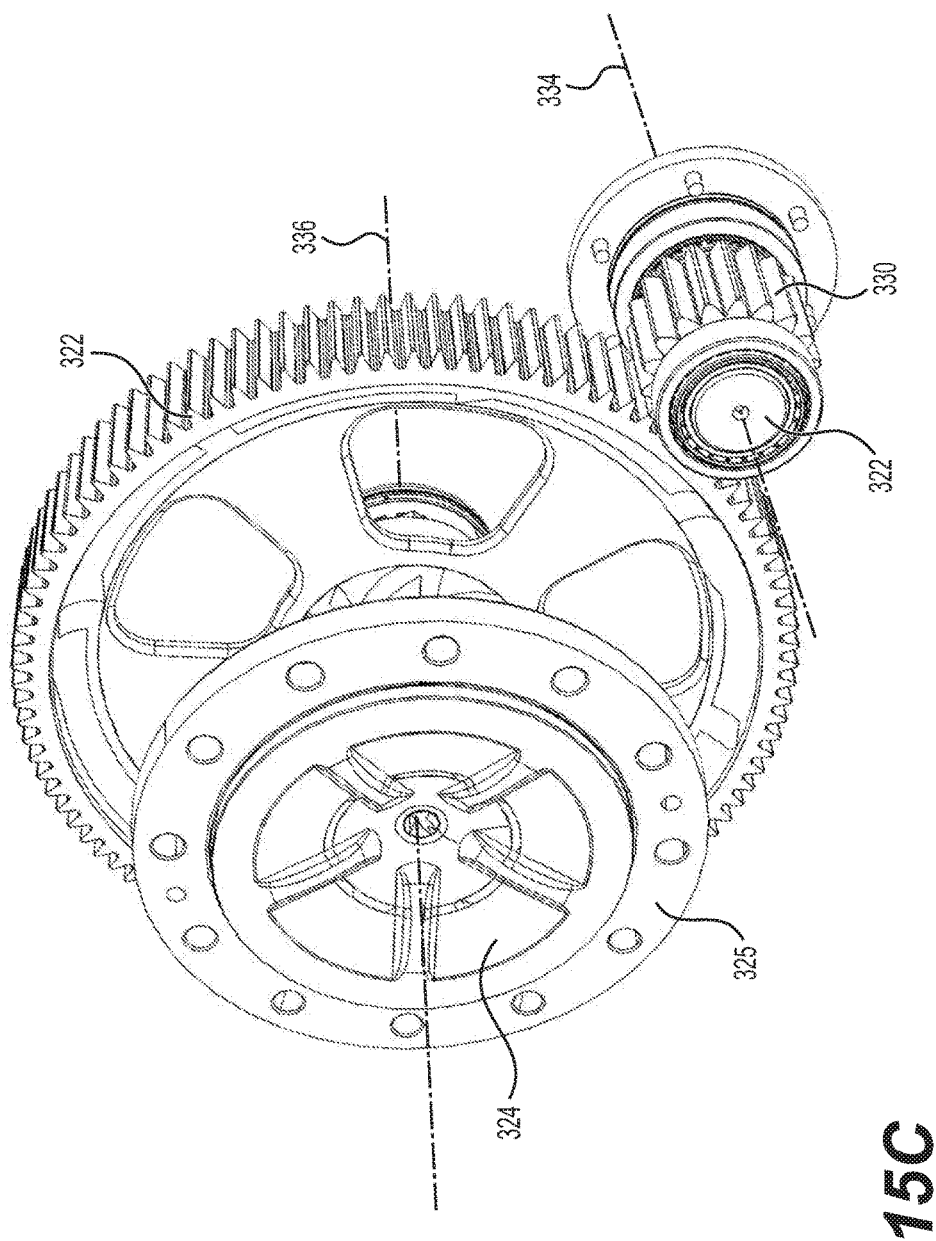
FIG. 15C is a perspective view taken from a front, top, right side of the components of FIG. 15B.

The output shaft 324 is connected to the output gear 332 and extends laterally outwardly from the housing 326. The output shaft 324 has a flanged portion 325. (FIG. 15C). The sprocket wheel 350 is connected to the flanged portion 325 of the output shaft 324 using fasteners 354 (FIG. 4). The teeth 352 of the sprocket wheel 350 engage the lugs 384 defined on the inner surface 382 of the endless track 380 and drive the endless track 380. As such, the track system 40 is a "positive drive" track system.

Leading and Trailing Wheel-Bearing Frame Members and Idler Wheels

Referring to FIGS. 1 to 4 and 16 and 17, in this embodiment the leading wheel-bearing frame member 200a is directly pivotably connected to the lower portion 184a of the leading frame members 170a about an axis 202a. In this embodiment, the trailing wheel-bearing frame member 200b is directly pivotably connected to the lower portion 184b of the trailing frame members 170b about an axis 202b (FIG. 17).

In FIGS. 16 to 18A, the track system 40 is shown in a rest position. In this embodiment, the nominal load of the track system corresponds to the track system being attached to the vehicle with the track system bearing its ordinary portion of the weight of the vehicle 60 when the vehicle 60 is at its tare weight, with no attachments at the front or rear and no payload in its container or tank. As shown in FIGS. 2 and 17, the axis 202b is above the axis 202a. Having the axis 202b above the axis 202a has been found to reduce the variations of the perimeter of the endless track 380 under certain conditions.

Referring to FIGS. 1 to 4, 10, 16 and 17, idler wheels $262a_1$, $262a_2$ of the leading idler wheel assembly 260a rotate about an axis 264a defined by an axle assembly 266a rotatably connecting the leading idler wheel assembly 260a to the leading wheel-bearing frame member 200a. Idler wheels $262b_1$, $262b_2$ of the trailing idler wheel assembly 260b rotate about an axis 264b defined by an axle assembly 266b rotatably connecting the trailing idler wheel assembly 260b to the trailing wheel-bearing frame member 200b. The idler wheels $262a_i$, $262b_1$ are disposed inwardly of the lugs 384 of the endless track 380, and the idler wheels $262a_2$, $262b_2$ are disposed outwardly of the lugs 384 of the endless track 380. The endless track 380 is guided between the inwardly disposed idler wheels $262a_i$, $262b_1$ and the outwardly disposed idler wheels $262a_2$, $262b_2$ along the ground engaging edge 392 of the endless track 380 (FIG. 16). The idler wheels $262a_1$, $262a_2$, $262b_1$, $262b_2$ have a same diameter, but in other embodiments the diameter of the leading and idler wheels $262a_1$, $262a_2$, $262b_1$, $262b_2$ could differ.

Tensioner

Figure 8:
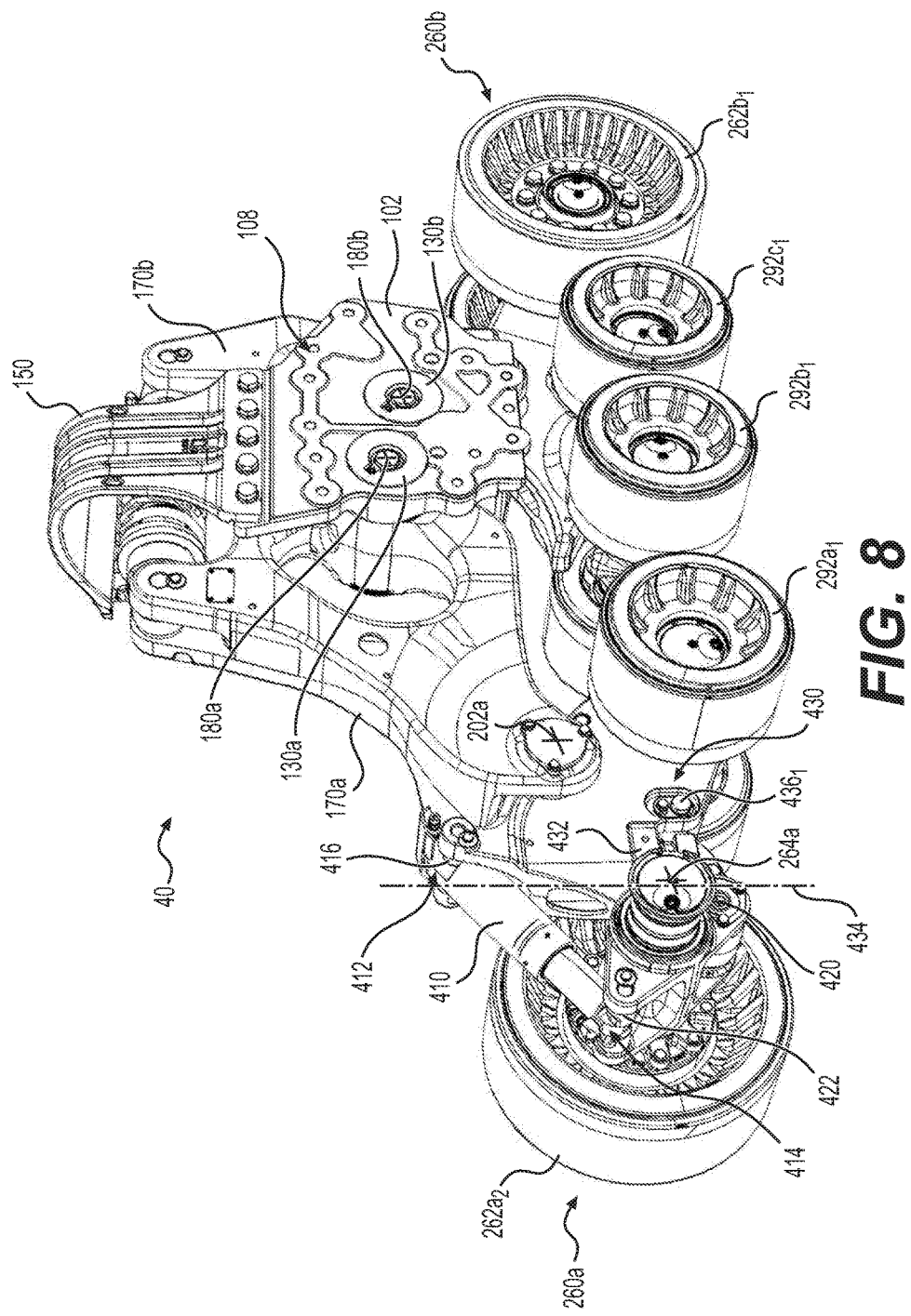
FIG. 8 is a perspective view taken from a front, top, left side of the track system of FIG. 7, with a leading idler wheel removed.
Figure 14:
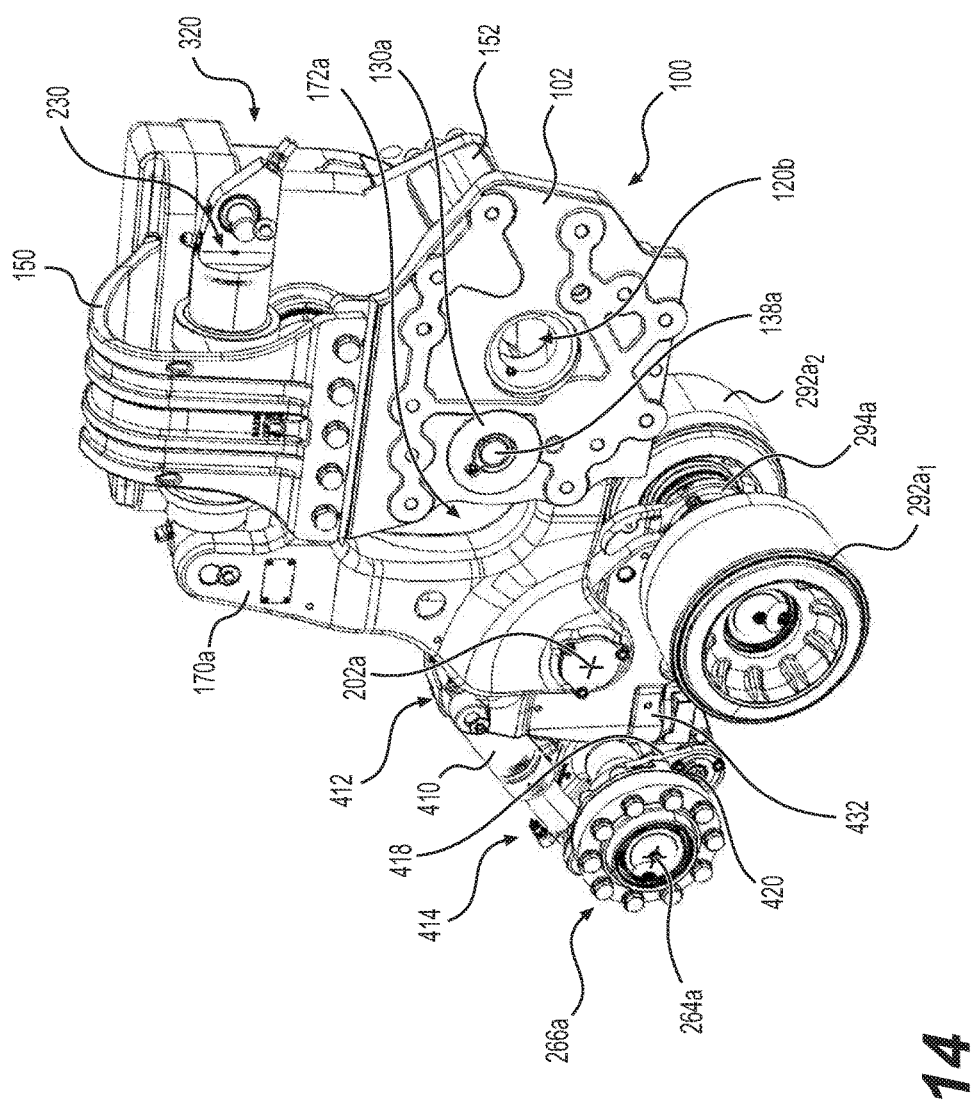
FIG. 14 is a perspective view taken from a rear, top, left side of the track system of FIG. 13, with a trailing pivot of the attachment assembly removed.

Referring to FIGS. 8, 10 and 14, the leading wheel-bearing frame member 200a includes a tensioner 410 having first and second ends 412, 414. The first end 412 is rotatably connected to the leading wheel-bearing frame member 200a at a proximal tensioning pivot 416. The proximal tensioning pivot 416 includes a spherical joint (not shown). A wheel linkage 418 is rotatably connected to the leading wheel-bearing frame member 200a at an axis 420 that is offset from the axis 264a. The second end 414 of the tensioner 410 is rotatably connected to the wheel linkage 418 at a distal tensioning pivot 422 which is offset from the axis 264a. In some embodiments, the distal tensioning pivot 422 includes a spherical joint and the proximal tensioning pivot 416 does not. In some embodiments, both the proximal and distal tensioning pivots 416, 422 include a spherical joint. The leading axle assembly 266a is operatively connected to the wheel linkage 418. The distal tensioning pivot 422 and the axis 420 are angularly displaced around the axis 264a such that the wheel linkage 418 forms a lever with the axis 420 being the fulcrum thereof. In some embodiments, the tensioner 410 could be included on the trailing wheel-bearing frame member 200b.

The action of the tensioner 410 and the wheel linkage 418 bias the leading axle assembly 266a and the leading idler wheel assembly 260a toward the forward end of the track system 40 with a biasing force 501 (FIGS. 16 and 18A). The endless track 380 opposes the biasing force 501 provided by the action of the tensioner 410 and the wheel linkage 418 and tension 502, 504 (FIGS. 16 and 18A) appears in the leading edge 390 and the ground-engaging edge 392 of the endless track 380.

In some embodiments, the tensioner 410 is used to reduce the variations in the perimeter of the endless track 380 due to the pivoting of the leading and trailing frame members 170a, 170b and wheel-bearing frame members 200a, 200b.

In addition, under certain conditions, if debris becomes stuck between one of the wheels and the endless track 380, the tensioner 410 is configured to apply less biasing force 501 and/or contract so as to reduce variation in the perimeter of the endless track 380. When debris are ejected from the track system 40, the tensioner 410 is configured to apply more biasing force 501 and/or extend to provide for adequate tension forces 502, 504 in the endless track 380.

In some embodiments, the tensioner 410 is a dynamic tensioning device as described in International Patent Application No. PCT/CA2016/050419, filed Apr. 11, 2016, entitled "Dynamic Tensioner Locking Device for a Track System and Method Thereof", and published as WO 2016/161528. The content of this application is incorporated herein by reference in its entirety.

Tracking Adjustment

Referring to FIGS. 8, 14 and 17, the leading wheel-bearing frame member 200a also includes a tracking adjustment system 430. The tracking adjustment system 430 includes a support 432 that is pivotable with respect to the leading wheel-bearing frame member 200a about an axis 434. The axle assembly 266a is rotatably connected to the support 432. Adjustment screws $436_1$, $436_2$ (FIGS. 8 and 17) are connected to the leading wheel-bearing frame member 200a, rearwardly offset of the axis 434. A portion (not shown) of the support 432 extends rearward of the axis 434. Each one of the adjustment screws $436_1$, $436_2$ abuts the portion of the support 432 and each one of the adjustment screws $436_1$, $436_2$ can be adjusted to pivot the support 432 inwardly or outwardly. As a result, the leading idler wheel assembly 260a can provide for tracking adjustment of the endless track 380 as it is driven around the sprocket wheel 350, the leading idler wheel assembly 260a, the trailing idler wheel assembly 260b, and the plurality of support wheel assemblies 290a, 290b, 290c.

Support Wheels

Referring to FIGS. 8, 14, 16 and 17, the support wheel assembly 290a includes support wheels $292a_1$, $292a_2$ that are rotatably connected to the leading wheel-bearing frame member 200a via an axle assembly 294a. The support wheels $292a_1$, $292a_2$ rotate about an axis 296a. The support wheel assemblies 290b, 290c include support wheels $292b_1$, $292b_2$, $292c_i$, $292c_2$ that are rotatably connected to the trailing support wheel assembly 210 via axle assemblies 294b, 294c. The support wheels $292b_1$, $292b_2$ rotate about an axis 296b and the support wheels $292c_1$, $292c_2$ rotate about an axis 296c.

The trailing support wheel assembly 210 includes a support wheel frame member 212 (FIG. 17). The support wheel member 212 has a body that is longitudinally elongated. The support wheel member 212 extends above the lugs 384 of the ground-engaging edge 392 of the endless track 380. The support wheel frame member 212 pivots about an axis 216 with respect to the trailing wheel-bearing frame member 200b. As such, the support wheel assemblies 290b, 290c are indirectly pivotably connected to the trailing wheel-bearing frame member 200b. The support wheel assembly 290b is disposed forward of the axis 216, and the support wheel assembly 290c is disposed rearward of the axis 216.

The endless track 380 is guided between the inwardly disposed support wheels $290a_1$, $290b_1$, $290c_1$ and the outwardly disposed support wheels $290a_2$, $290b_2$, $290c_2$ as the lugs 384 of the ground-engaging edge 392 of the endless track 380 extend therebetween. The support wheels $292a_i$, $292a_2$, $292b_1$, $292b_2$, $292c_1$, $292c_2$ have a smaller diameter than that of the idler wheels $262a_i$, $262a_2$, $262b_1$, $262b_2$. In some embodiments, the leading wheel bearing member 200a could include a support wheel frame member pivotably connected thereto and including leading support wheels.

Material and Manufacturing

The various components of the track system 40 are made of conventional materials (e.g. metals and metal alloys in most cases, such as steel) via conventional manufacturing processes (e.g. casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Lines and Resultant Forces

Referring to FIG. 5, a plane 500 extends parallel to a longitudinal direction of the track system 40 and extends parallel to a height direction of the track system 40. FIGS. 16 to 18C illustrate the track system 40 in a plane view that is parallel to the plane 500. The pivot axes 180a, 180b and the axes 202a, 202b, 216, 264a, 264b, 296a, 296b, 296c are perpendicular to the plane 500.

Referring to FIGS. 16 to 18A, the leading pivot axis 180a and the axis 202a are spaced apart by a longitudinal distance 600a defined in the plane 500. The trailing pivot axis 180b and the axis 202b are spaced apart by a longitudinal distance 600b defined in the plane 500. In this embodiment, the longitudinal distance 600a is greater than the longitudinal distance 600b. As a result, the leading frame member 170a defines a lever arm between the leading pivot axis 180a and the axis 202a that is greater than the lever arm defined by the trailing frame member 170b between the trailing pivot axis 180b and the axis 202b. As a portion of the weight of the vehicle 60 is transferred from the chassis 62 to track system 40 via the attachment assembly 100 and to the pivots 130a, 130b, and in turn to the leading and trailing frame members 170a, 170b, the trailing frame member 170b supports a greater load than the leading frame member 170a since the lever arm defined by the trailing frame member 170b between the trailing pivot axis 180b and the axis 202b is shorter. To support the additional load on the trailing frame member 170b and in order to more evenly distribute the weight of the vehicle 60 over the endless track 380, the trailing wheel-bearing frame member 200b has more support wheel assemblies indirectly rotatably connected thereto than the leading wheel-bearing frame member 200a (namely the support wheel assemblies 290b, 290c rotatably connected to the trailing support wheel assembly 210).

The axes 296a, 202a are spaced apart in a longitudinal direction by a longitudinal distance 620a defined in the plane 500. The axes 264a, 202a are spaced apart in a longitudinal direction by a longitudinal distance 630a defined in the plane 500. In this embodiment, the distance 620a is shorter than the distance 630a. A portion of the weight of the vehicle 60 is transferred at the axis 202a from the leading frame member 170a to the leading wheel-bearing member 200a. Since the lever arm defined by the portion of the leading wheel-bearing member 200a supporting the leading support wheel assembly 290a is shorter than the portion of leading wheel-bearing member 200a supporting the leading idler wheel assembly 260a, the leading support wheel assembly 290a supports more load than the leading idler wheel assembly 260a.

The axes 216, 202b are spaced apart in a longitudinal direction by a longitudinal distance 620b defined in the plane 500. The axes 264b, 202a are spaced apart in a longitudinal direction by a longitudinal distance 630b defined in the plane 500. In this embodiment, the distance 620b is shorter than the distance 630b. A portion of the weight of the vehicle 60 is transferred at the axis 202b from the trailing frame member 170*b* to the trailing wheel-bearing member 200*b*. Since the lever arm defined by the portion of the leading wheel-bearing member 200*b* supporting the support wheel frame member 212 is shorter than the portion of trailing wheel-bearing member 200*b* supporting the trailing idler wheel assembly 260*b*, the support wheel frame member 212 and the support wheel assemblies 290*b*, 290*c* support more load than the trailing idler wheel assembly 260*b*.

The axes 296*b*, 216 are spaced apart in a longitudinal direction by a longitudinal distance 640*b* defined in the plane 500. Similarly, the axes 296*c*, 216 are spaced apart in a longitudinal direction by a longitudinal distance 640*c* defined in the plane 500. In this embodiment, the distances 640*b*, 640*c* are equal. As such, the trailing support wheel assemblies 290*b*, 290*c* support equal loads.

By using the teachings in the present description and by selecting the dimensions of the various components described herein, a designer of track systems is able to set a distribution of pressure applied to the endless track 380 by the leading and trailing idler wheel assemblies 260*a*, 260*b* and the support wheel assemblies 290*a*, 290*b*, 290*c* to meet the requirements of a particular application.

In the present embodiment, the distances 600*a*, 600*b*, 620*a*, 620*b*, 630*a*, 630*b*, 640*b*, 640*c*, the diameter and width of the idler and support wheel assemblies 260*b*, 290*a*, 290*b*, 290*c* are selected to equalize the pressure applied to the endless track 380 by the leading support wheel assembly 290*a*, the trailing support wheel assemblies 290*b*, 290*c* and the trailing idler wheel assembly 260*b*. In this embodiment, the pressure applied to the endless track 380 by the leading idler wheel assembly 260*a* is less than the pressure applied by each one of the leading support wheel assembly 290*a*, the trailing support wheel assemblies 290*b*, 290*c* and the trailing idler wheel assembly 260*b*.

Other configurations in other embodiments are contemplated. For instance, the distances 600*a*, 600*b*, 620*a*, 620*b*, 630*a*, 630*b*, 640*b*, 640*c*, the diameter and width of the idler and support wheel assemblies 260*a*, 260*b*, 290*a*, 290*b*, 290*c* could be selected to equalize the pressure applied to the endless track 380 by the support wheel assemblies 290*a*, 290*b*, 290*c*. In yet other embodiments, the distances 600*a*, 600*b*, 620*a*, 620*b*, 630*a*, 630*b*, 640*b*, 640*c*, the diameter and width of the idler and support wheel assemblies 260*a*, 260*b*, 290*a*, 290*b*, 290*c* could be selected to equalize the pressure applied to the endless track 380 by the leading and trailing idler wheel assemblies 260*a*, 260*b*.

Note that in the accompanying Figures, the arrows indicating the tension forces, torques and biasing force are not to scale (they are schematic). Referring to FIG. 18A and as described above, the action of the tensioner 410 and the wheel linkage 418 on the leading idler wheel assembly 260*a* generate a biasing force 501 at the axis 264*a*. As a result, opposed tension forces 502, 504 exist in the leading and ground engaging edges 390, 392 of the endless track 380. A resultant force 510 (e.g. the combination of tension forces 502, 504) is applied to the leading idler wheel assembly 260*a* at the axis 264*a* and opposes biasing force 501. The leading and ground engaging edges 390, 392 of the endless track 380 form an angle 700*a*. The resultant force 510 is colinear with a bisector 702*a* of the angle 700*a*.

The leading wheel-bearing frame member 200*a* carries the resultant force 510 to the axis 202*a* along a line 550*a* extending between the axis 264*a* and the axis 202*a*, the line 550*a* being shown as a dashed line in FIGS. 16 and 18A to 18E. In the present embodiment, the line 550*a* is colinear with the bisector 702*a*, but it could be otherwise in other embodiments as other configurations of the leading wheel bearing frame member 200*a* are contemplated. Having the resultant force 510 passing at the axis 202*a* has the effect of preventing the generation of a torque that is applied to the leading wheel-bearing member 200*a* about the axis 202*a*. The line 550*a* and the bisector 702*a* pass below the leading pivot axis 180*a*. The bisector 702*a* and the pivot axis 180*a* are spaced apart by a shortest distance 552*a* defined in the plane 500. The distance 552*a* defines a lever arm between the bisector 702*a* and the pivot axis 180*a*. As the resultant force 510 is applied along the bisector 702*a*, the resultant force 510 passes below the leading pivot axis 180*a*. A torque 540*a* is applied to the leading frame member 170*a* about the leading pivot axis 180*a*. From the perspective of FIG. 18A, the torque 540*a* has the effect of inducing a clockwise rotation of the leading frame member 170*a* about the pivot axis 180*a*. The torque 540*a* also has the effect of increasing the load supported by the leading support wheel assembly 290*a* and the load supported by the leading idler wheel assembly 260*a*.

To oppose the tension forces 504, equally opposed tension forces 520 are applied on the ground-engaging edge 392 of the endless track 380 proximate to the trailing idler wheel assembly 260*b*. Tension forces 522 also appear in the trailing edge 394 of the endless track 380 and oppose tension forces 524, 526 appearing in the endless track 380 adjacent to the sprocket wheel 350. In FIG. 18A, tension forces 502, 504, 520, 522, 524, 526 are equal. A resultant force 530 (e.g. the combination of tension forces 520, 522) is applied to the trailing idler wheel assembly 260*b* and the resultant force 530 is applied at the axis 264*b*.

The trailing and ground engaging edges 394, 392 of the endless track 380 form an angle 700*b*. The resultant force 530 is colinear with a bisector 702*b* of the angle 700*b*. The trailing wheel-bearing frame member 200*b* carries the resultant force 530 to the axis 202*b* along a line 550*b* extending between the axis 264*b* and the axis 202*b*, shown as a dashed line in FIGS. 16 and 18A to 18E. In the present embodiment, the line 550*b* is colinear with the bisector 702*b*, but it could be otherwise in other embodiments as other configurations of the trailing wheel bearing frame member 200*b* are contemplated. Having the resultant force 530 passing at the axis 202*b* has the effect of preventing the generation of a torque that is applied to the trailing wheel-bearing member 200*b* about the axis 202*b*. The line 550*b* and the bisector 702*b* pass below the trailing pivot axis 180*b*. The bisector 702*b* and the pivot axis 180*b* are spaced apart by a shortest distance 552*b* defined in the plane 500. The distance 552*b* defines a lever arm between the bisector 702*b* and the pivot axis 180*b*. As the resultant force 530 is applied along the bisector 702*b*, the resultant force 530 passes below the trailing pivot axis 180*b*. A torque 540*b* is applied to the trailing frame member 170*b* about the trailing pivot axis 180*b*. From the perspective of FIG. 18A, the torque 540*b* has the effect of inducing a counter-clockwise rotation of the trailing frame member 170*b* about the pivot axis 180*b*. The torque 540*b* also has the effect of increasing the load supported by the support wheel assemblies 290*b*, 290*c* and the load supported by the trailing idler wheel assembly 260*b*.

In the present embodiment, the distance 552*b* is greater than the distance 552*a*. In addition, the magnitude of the resultant force 530 is greater than the resultant force 510. Thus, the torque 540*b* has a greater magnitude than the torque 540*a*. Thus, a net torque (e.g. the combination of torques 540*a*, 540*b*) having the same direction than torque 540*b* is applied to the track system 40.

It is noted that, in some embodiments, the bisector 702*a* could pass above the leading pivot axis 180*a*. In such cases, the distance 552*a* could be greater than the distance 552*b* as the net torque applied to the track system 40 would still have the same direction as torque 540*b*.

When the track system 40 is driven, additional tension forces appear in the endless track 380 because of the tractive forces applied by the sprocket wheel 350 to the endless track 380. As such, the magnitude of tension forces 524, 522 and 520 increases. Simultaneously, the tensioner 410 is configured to increase its biasing force 501 and maintain adequate tension forces 502, 504 in the endless track 380. These additional tension forces make the magnitude of the resultant force 530 greater when the track system 40 is driven, and higher than the magnitude of the resultant force 510.

When the track system 40 is driven, the pressures applied to the endless track 380 under the leading idler wheel assembly 260*a* and leading support wheel assembly 290*a* are decreased, and the pressures applied to the endless track 380 under the support wheel assemblies 290*b*, 290*c* and trailing idler wheel assembly 260*b* are increased. As a result, under certain conditions, the track system 40 has a reduced tendency to pitch negatively, especially when driven on soft grounds.

Moreover, under certain conditions, heat generation and wear of the outer surface 386 (FIG. 4) of the endless track 380 are reduced when comparing the track system 40 to conventional track systems attached to the same vehicle 60 for the following reasons. First, as there is a reduced pressure applied under the leading idler wheel assembly 260*a*, there is a reduced pressure applied to endless track 380 as it engages the ground and the tread 388 has improved engagement with the ground before being parallel thereto and being subjected to tractive forces. Second, as the weight of the vehicle 60 increases, the surface area of the endless track 380 over the ground increases due to the scissor-like structure of the track system 40. Thus, the pressure on the ground increases at a rate that is less than the rate of increase in weight of the vehicle 60.

Figure 18B:
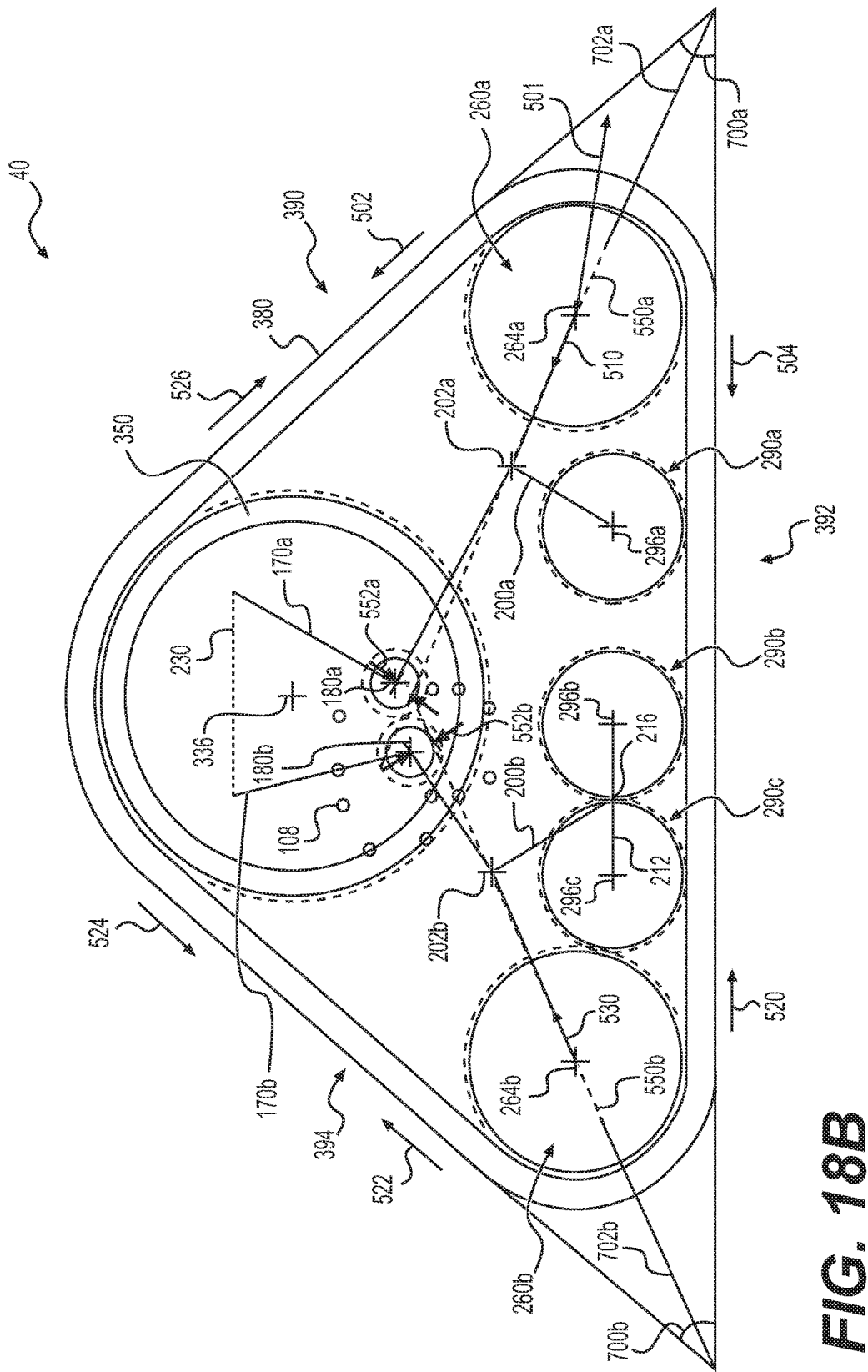
FIG. 18B is a schematic, right side elevation diagram of the track system of FIG. 1 in a fully compressed position.
Figure 18C:
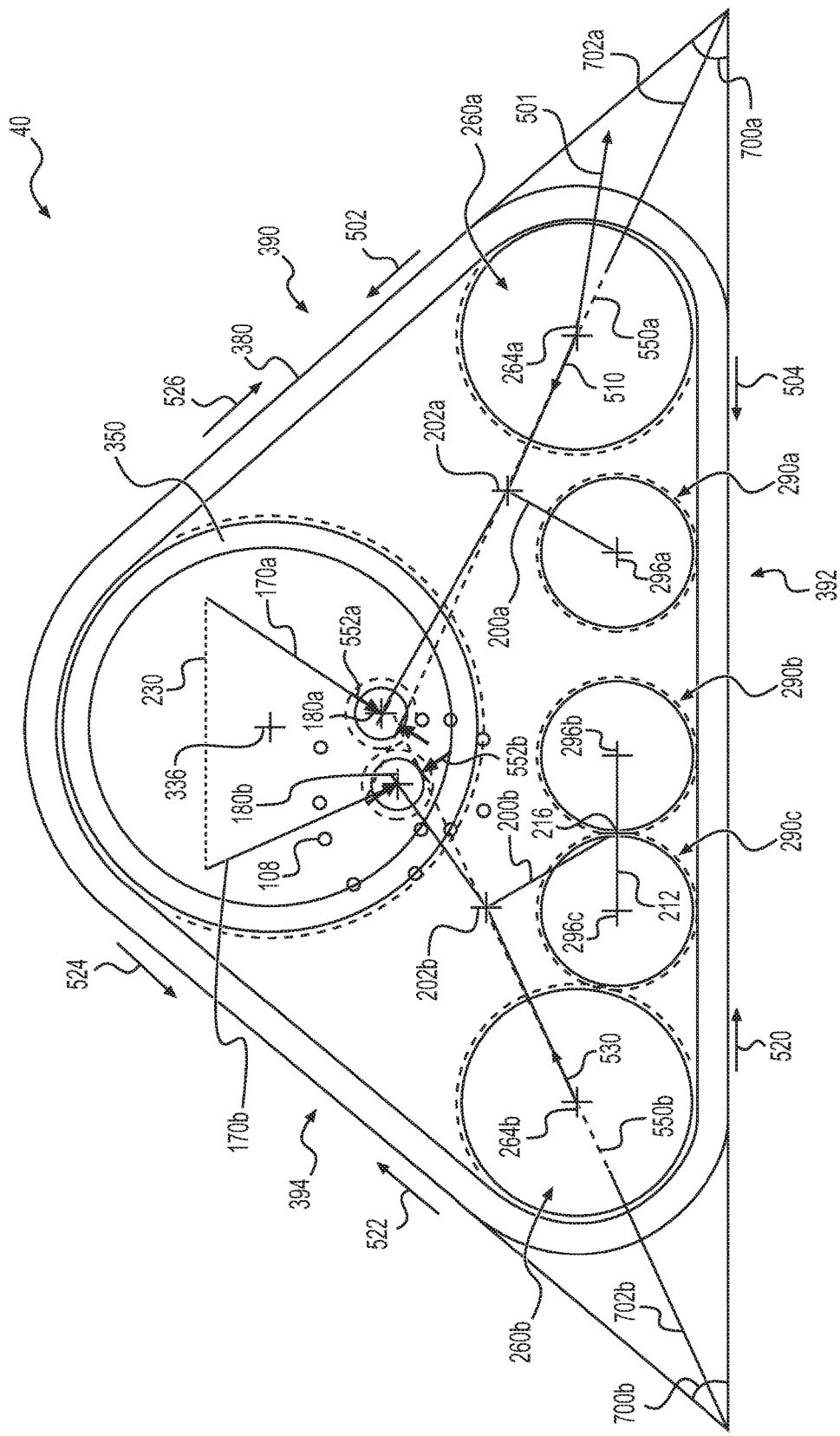
FIG. 18C is a schematic, right side elevation diagram of the track system of FIG. 1 in a fully extended position.
Figure 18D:
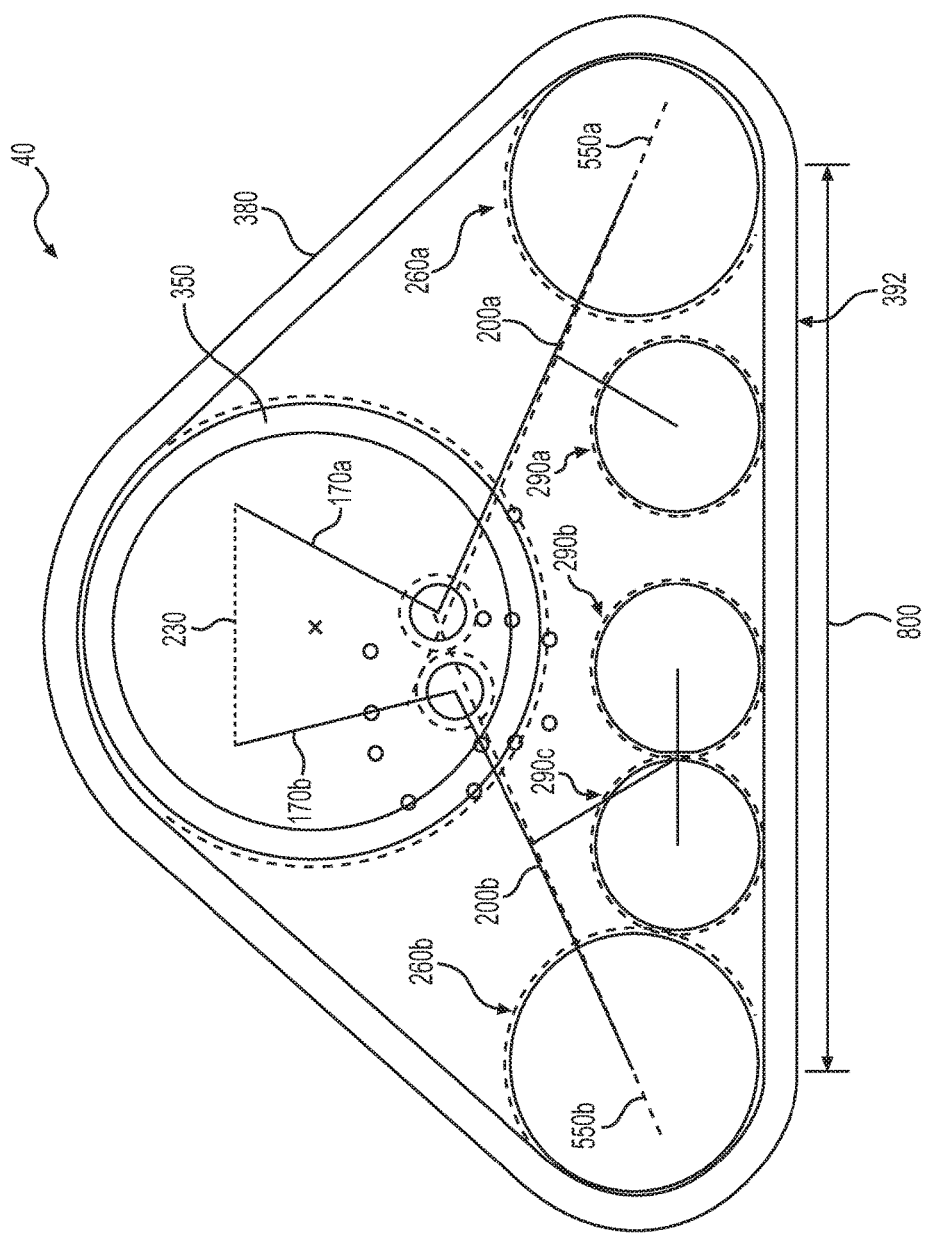
FIG. 18D is a schematic, right side elevation diagram of the track system of 18B.

FIGS. 18B, 18C, 18D and 18E illustrate different positions of the track system 40 when stationary. In FIGS. 18B and 18D, the track system 40 is shown with the damper 230 fully compressed. Such configuration would be found when the track system 40 supports a load that is greater than the nominal load. In FIGS. 18C & 18D, the track system 40 is shown with the damper fully extended. Such configuration would be found when the track system 40 supports a load that is smaller than the nominal load.

Referring to FIG. 18B, when the damper 230 is fully compressed, the leading frame member 170*a* is pivoted counter-clockwise and the trailing frame member 170*b* is pivoted clockwise, in the perspective of FIG. 18B. The lines 550*a*, 550*b* and the bisectors 702*a*, 702*b* still pass below the leading and trailing pivot axes 180*a*, 180*b* respectively. Furthermore, the distance 552*b* remains greater than the distance 552*a*.

Referring to FIG. 18C, when the damper 230 is fully extended, the leading frame member 170*a* is pivoted clockwise and the trailing frame member 170*b* is pivoted counter-clockwise, in the perspective of FIG. 18C. The lines 550*a*, 550*b* and the bisectors 702*a*, 702*b* still pass below the leading and trailing pivot axes 180*a*, 180*b* respectively. Again, the distance 552*b* remains greater than the distance 552*a*.

As such, the track system 40 maintains its reduced tendency to pitch negatively when it is driven, regardless of the load of the vehicle 60.

Figure 18E:
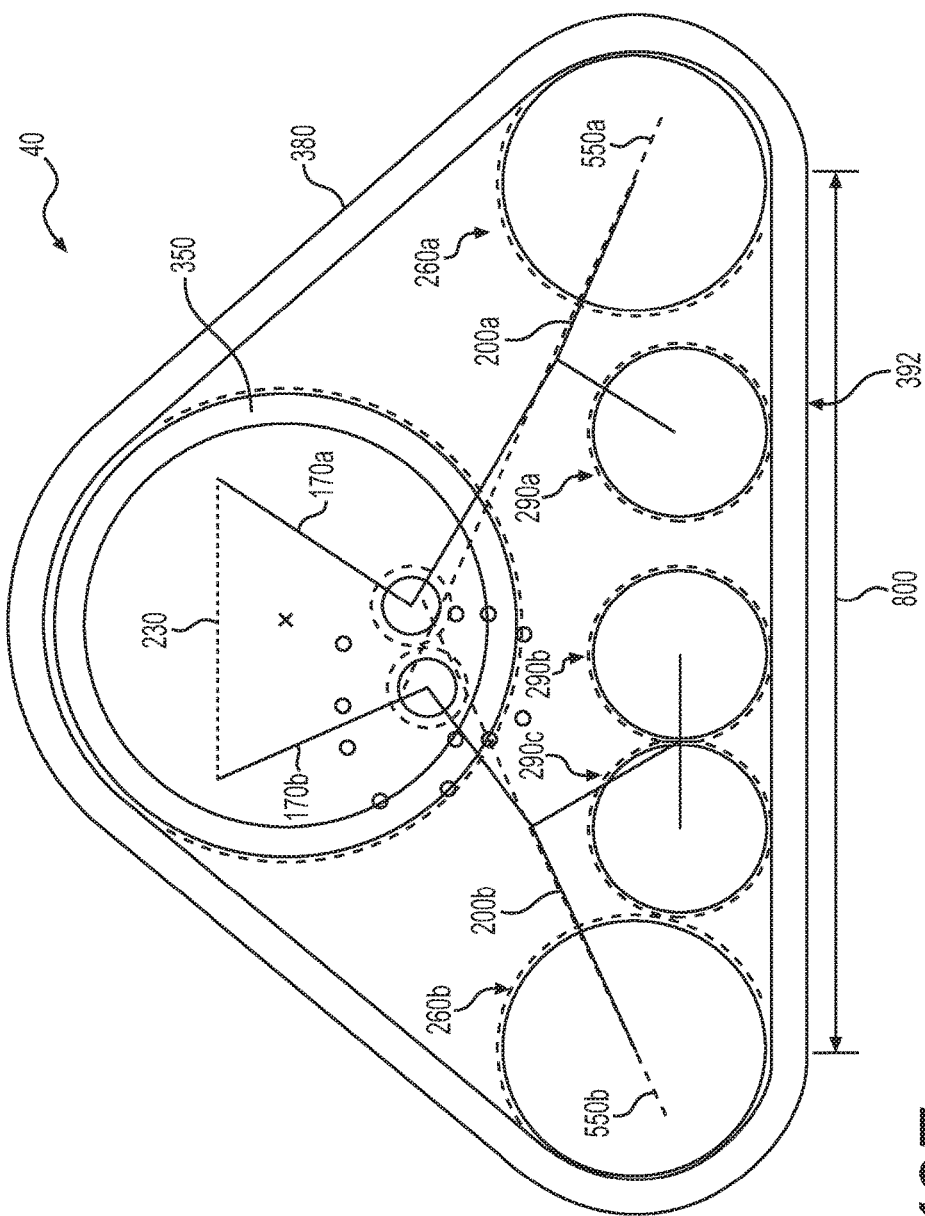
FIG. 18E is a schematic, right side elevation diagram of the track system of FIG. 18C.

Referring to FIG. 18D, when the damper 230 is fully compressed, the leading idler wheel assembly 260*a* is spaced apart from the trailing idler wheel assembly 260*b*, by a distance 800 (measured between the axes of rotation of each of the idler wheel assemblies 260*a*, 260*b*). Referring to FIG. 18E, when the damper 230 is fully extended, the leading idler wheel assembly 260*a* is spaced apart from the trailing idler wheel assembly 260*b*, by a distance 800 (measured between the axes of rotation of each of the idler wheel assemblies 260*a*, 260*b*). The distance 800 in FIG. 18D is greater than the distance 800 in FIG. 18E. Thus, the track 380 has a ground-contacting area that increases in size as a load borne by the track system 40 increases (and the damper compresses).

In addition to the reduced tendency of the track system 40 to pitch negatively, when the track system 40 encounters an obstacle such as a bump or a depression along its path of travel, the pivoting of the leading and trailing wheel-bearing members 200*a*, 200*b*, and of the leading and trailing frame members 170*a*, 170*b* has the effect of reducing vertical displacements of the leading and trailing pivots 130*a*, 130*b*. Accordingly, vertical displacements of the chassis 62 of the vehicle 60 are reduced. Notably, at certain speed regimes, the pivoting of the leading and trailing wheel-bearing members 200*a*, 200*b* alone is sufficient to reduce the vertical displacements of the leading and trailing pivots 130*a*, 130*b*. At other speed regimes, it is the combined action of the pivoting of the leading and trailing wheel-bearing members 200*a*, 200*b* and of the leading and trailing frame members 170*a*, 170*b*, and the damping action of the damper 230 that reduce the vertical displacements of the leading and trailing pivots 130*a*, 130*b*.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for use with a vehicle having a chassis and a drive shaft extending laterally outwardly from the chassis for driving the track system, the track system comprising:
   an attachment assembly connectable to the chassis of the vehicle, the attachment assembly having a leading pivot and a trailing pivot extending laterally outwardly therefrom;
   a multi-member frame assembly disposed laterally outwardly from the attachment assembly, the multi-member frame assembly including:
      a leading frame member pivotably connected to the attachment assembly via the leading pivot for pivoting about a leading pivot axis;
      a trailing frame member pivotably connected to the attachment assembly via the trailing pivot for pivoting about a trailing pivot axis;
      a leading wheel-bearing frame member at least indirectly pivotably connected to the leading frame member;
      a trailing wheel-bearing frame member at least indirectly pivotably connected to the trailing frame member;
   a damper interconnecting the leading frame member and the trailing frame member;
   a leading idler wheel assembly rotatably connected to the leading wheel-bearing frame member;

a trailing idler wheel assembly rotatably connected to the trailing wheel-bearing frame member;
a plurality of support wheel assemblies disposed intermediate the leading idler wheel assembly and the trailing idler wheel assembly;
a gearbox having an input shaft operatively connectable to the drive shaft of the vehicle and an output shaft;
a sprocket wheel operatively connected to the output shaft of the gearbox; and
an endless track extending around the sprocket wheel, the leading idler wheel assembly, the trailing idler wheel assembly, and the plurality of support wheel assemblies, and drivable by the sprocket wheel.

2. The track system of claim 1, wherein:
at least one of the leading frame member and the trailing frame member has an aperture therein; and
at least one of the gearbox input shaft and the drive shaft of the vehicle extends through the aperture, the aperture being shaped and dimensioned so as to allow pivotal motion of the at least one of the leading frame member and the trailing frame member notwithstanding a presence of the at least one of the gearbox input shaft and the drive shaft of the vehicle extending through the aperture.

3. The track system of claim 1, wherein:
the leading frame member has a first aperture therein;
the trailing frame member has a second aperture therein;
at least one of the gearbox input shaft and the drive shaft of the vehicle extends through one of the first aperture and the second aperture, the one of the first aperture and the second aperture being shaped and dimensioned so as to allow pivotal motion of the one of the leading frame member and trailing frame member notwithstanding a presence of the at least one of the gearbox input shaft and the drive shaft of the vehicle extending therethrough; and
a stop extends within the other of the first aperture and the second aperture, the stop being structured and dimensioned to limit pivotal movement of the other of the leading frame member and trailing frame member.

4. The track system of claim 3, wherein the stop is connected to the gearbox.

5. The track system of claim 1, wherein the leading pivot axis is disposed above the trailing pivot axis.

6. The track system of claim 1, wherein:
the leading wheel-bearing frame member is directly pivotably connected to the leading frame member about a first axis;
the trailing wheel-bearing frame member is directly pivotably connected to the trailing frame member about a second axis
the first and second axes, the leading pivot axis and the trailing pivot axis extend perpendicularly to a plane extending parallel to a longitudinal direction of the track system; and
in a rest position of the track system, the second axis is above the first axis.

7. The track system of claim 1, wherein:
the endless track has leading, trailing and ground engaging edges;
a first angle is formed between the trailing and ground engaging edges, and a second angle is formed between the leading and ground engaging edges;
the first angle has a bisector; and
the bisector of the first angle passes below the trailing pivot axis.

8. The track system of claim 7, wherein:
the leading wheel-bearing frame member is directly pivotably connected to the leading frame member about a first axis;
the trailing wheel-bearing frame member is directly pivotably connected to the trailing frame member about a second axis;
idler wheels of the leading idler wheel assembly rotate about a third axis;
idler wheels of the trailing idler wheel assembly rotate about a fourth axis;
the first, second, third and fourth axes, the leading pivot axis and the trailing pivot axis extend perpendicularly to a plane extending parallel to a longitudinal direction of the track system; and
the second and fourth axes intersect the bisector of the first angle.

9. The track system of claim 8, wherein:
the second angle has a bisector; and
the bisector of the second angle passes below the leading pivot axis.

10. The track system of claim 9, wherein the first and third axes intersect the bisector of the second angle.

11. The track system of claim 9, wherein a shortest distance defined in the plane between the bisector of the first angle and the trailing pivot axis is greater than a shortest distance defined in the plane between the bisector of the second angle and the leading pivot axis.

12. The track system of claim 8, wherein a first longitudinal distance defined in the plane between the leading pivot axis and the first axis is greater than a second longitudinal distance defined in the plane between the trailing pivot axis and the second axis.

13. The track system of claim 8, wherein a trailing support wheel assembly is pivotably connected to the trailing wheel-bearing frame member about a fifth axis, and a third longitudinal distance defined in the plane between the second axis and the fourth axis is greater than a fourth longitudinal distance defined in the plane between the second axis and the fifth axis.

14. The track system of claim 13, wherein leading support wheels are rotatably connected to the leading wheel-bearing frame member about a sixth axis, and the fourth longitudinal distance is greater than a fifth longitudinal distance defined in the plane between the first axis and the sixth axis.

15. The track system of claim 1, wherein a load supported by the trailing wheel-bearing frame member is greater than a load supported by the leading wheel-bearing frame member.

16. The track system of claim 1, wherein a trailing support wheel assembly is pivotably connected to the trailing wheel-bearing frame member, the trailing support wheel assembly including a support wheel frame member, a pair of forward support wheels rotatably connected to the support wheel frame member, and a pair of rearward support wheels rotatably connected to the support wheel frame member.

17. The track system of claim 1, wherein the attachment assembly includes:
a plate having leading pivot receiving hole shaped and dimensioned to receive the leading pivot and a trailing pivot receiving hole shaped and dimensioned to receive the trailing pivot; and
the leading pivot extends through the leading pivot receiving hole and the trailing pivot extends through the trailing pivot receiving hole.

18. The track system of claim 17, wherein:
- the plate has a shoulder recess defined around each of the leading pivot receiving hole and the trailing pivot receiving hole;
- the leading pivot has a shoulder portion shaped and dimensioned to abut the shoulder recess of the leading pivot receiving hole of the plate; and
- the trailing pivot has a shoulder portion shaped and dimensioned to abut the shoulder recess of the trailing pivot receiving hole of the plate.

19. The track system of claim 1, further comprising fasteners extending axially through the leading pivot and the trailing pivot to fasten the gearbox.

20. The track system of claim 1, wherein the damper is disposed laterally inwardly from the gearbox.

21. The track system of claim 1, wherein the track has a ground-contacting area that increases in size as a load borne by the track system increases.

\* \* \* \* \*